US012338989B2

(12) United States Patent
Friedman et al.

(10) Patent No.: US 12,338,989 B2
(45) Date of Patent: *Jun. 24, 2025

(54) LIGHT EMITTING ASSEMBLY FOR A POWER TOOL

(71) Applicant: Black & Decker Inc., New Britain, CT (US)

(72) Inventors: Brian E. Friedman, Baltimore, MD (US); Joseph Patrick Kelleher, Parkville, MD (US); David Irwin, Cockeysville, MD (US); Richard Dizon, Baltimore, MD (US); Heather Schafer, Street, MD (US); Michael Sikora, Baltimore, MD (US); Abraham Lozier, Kingsville, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,201

(22) Filed: Oct. 18, 2023

(65) Prior Publication Data

US 2024/0044483 A1 Feb. 8, 2024

Related U.S. Application Data

(63) Continuation of application No. 17/661,432, filed on Apr. 29, 2022, now Pat. No. 11,835,217.

(Continued)

(51) Int. Cl.

*F21V 33/00* (2006.01)
*B25B 23/18* (2006.01)

(Continued)

(52) U.S. Cl.

CPC .......... *F21V 33/0084* (2013.01); *B25B 23/18* (2013.01); *F21S 9/02* (2013.01);

(Continued)

(58) Field of Classification Search

CPC . F21S 9/02; B25B 23/18; H05B 47/17; F21V 33/0084; F21V 21/145; F21V 21/30

See application file for complete search history.

(56) References Cited

U.S. PATENT DOCUMENTS 4,225,906 A * 9/1980 Gulliksen .............. F21V 19/04 362/240
4,317,176 A 2/1982 Saar et al.

(Continued)

FOREIGN PATENT DOCUMENTS

CN 203052410 U 7/2013
CN 204372665 U 6/2015

(Continued)

OTHER PUBLICATIONS

Extended European Search Report for Appln No. 22171637.6 mailed Oct. 7, 2022, 9 pages.

*Primary Examiner* — Arman B Fallahkhair
(74) *Attorney, Agent, or Firm* — Brake Hughes Bellermann LLP

(57) ABSTRACT

A power tool includes a housing containing a motor, an output member configured to be driven by the motor to perform an operation on a workpiece, and a handle having a first end portion coupled to the housing and a second end portion. A base is coupled to the second end portion of the handle. A light emitting assembly is pivotably coupled to the base. The light emitting assembly is configured to be operable in a first mode to illuminate a workpiece and a second mode to indicate a condition of the power tool responsive to the power tool signaling the condition to the light emitting assembly.

18 Claims, 28 Drawing Sheets

Related U.S. Application Data

(60) Provisional application No. 63/201,611, filed on May 6, 2021.

(51) Int. Cl.

| | |
|---|---|
| ***F21S 9/02*** | (2006.01) |
| ***F21V 21/14*** | (2006.01) |
| ***F21V 21/30*** | (2006.01) |
| ***F21Y 115/10*** | (2016.01) |
| ***H05B 47/17*** | (2020.01) |

(52) U.S. Cl.

CPC ............ *F21V 21/145* (2013.01); *F21V 21/30* (2013.01); *H05B 47/17* (2020.01); *F21Y 2115/10* (2016.08)

(56) References Cited

U.S. PATENT DOCUMENTS

| | | | |
|---|---|---|---|
| 5,097,399 A | 3/1992 | Gammache | |
| 5,169,225 A | 12/1992 | Palm | |
| 5,749,646 A | 5/1998 | Brittell | |
| 5,871,272 A | 2/1999 | Sharrah et al. | |
| 6,158,874 A | 12/2000 | Brustein et al. | |
| 6,168,302 B1 | 1/2001 | Hulse | |
| 6,238,074 B1 | 5/2001 | Hulse et al. | |
| 6,364,580 B1 | 4/2002 | Dils et al. | |
| 6,536,536 B1 | 3/2003 | Gass et al. | |
| 6,554,462 B2 | 4/2003 | Hulse et al. | |
| 6,575,590 B1 * | 6/2003 | Wadsworth | B25F 5/021 362/120 |
| D485,382 S | 1/2004 | Palm | |
| 6,733,166 B2 | 5/2004 | Hulse | |
| 6,979,155 B2 | 12/2005 | Dils et al. | |
| 7,029,142 B2 * | 4/2006 | Chen | B25F 5/021 173/4 |
| 7,066,619 B2 | 6/2006 | Waters | |
| 7,182,148 B1 | 2/2007 | Szieff | |
| 7,185,998 B2 | 3/2007 | Oomori et al. | |
| 7,357,526 B2 * | 4/2008 | Zeiler | B25B 23/18 362/120 |
| 7,410,006 B2 | 8/2008 | Zhang et al. | |
| 7,434,962 B2 | 10/2008 | Stache | |
| 7,447,565 B2 | 11/2008 | Cerwin | |
| 7,498,526 B2 | 3/2009 | Lohr et al. | |
| 7,815,356 B2 | 10/2010 | Lutz et al. | |
| 7,871,177 B1 | 1/2011 | Hanchett | |
| 7,934,847 B2 | 5/2011 | Oomori et al. | |
| 8,075,156 B2 | 12/2011 | Steele et al. | |
| 8,316,958 B2 | 11/2012 | Schell et al. | |
| 8,360,597 B1 | 1/2013 | Hanchett | |
| 8,517,558 B2 | 8/2013 | Oomori et al. | |
| 9,028,088 B2 | 5/2015 | Vanko et al. | |
| 9,144,875 B2 | 9/2015 | Schlesak et al. | |
| 9,328,915 B2 | 5/2016 | Vanko et al. | |
| 9,464,893 B2 | 10/2016 | Vanko et al. | |
| 9,573,257 B2 | 2/2017 | Kynast et al. | |
| 9,625,135 B2 | 4/2017 | Lin et al. | |
| 9,923,249 B2 * | 3/2018 | Rejman | B25F 5/02 |
| 10,018,337 B2 | 7/2018 | Dorman et al. | |
| 10,058,989 B2 * | 8/2018 | Chellew | B25F 5/00 |
| 10,119,663 B2 | 11/2018 | Bayat et al. | |
| 10,131,043 B2 * | 11/2018 | Mergener | B25B 23/1475 |
| 10,344,951 B2 | 7/2019 | Aoki et al. | |
| 10,400,962 B2 | 9/2019 | Keller | |
| 10,458,631 B2 | 10/2019 | Dorman et al. | |
| 10,478,950 B2 | 11/2019 | Nagasaka et al. | |
| 10,738,980 B2 | 8/2020 | Worman | |
| 10,906,163 B2 | 2/2021 | Nagasaka et al. | |
| 2004/0090781 A1 | 5/2004 | Yeoh | |
| 2005/0111223 A1 | 5/2005 | Lee et al. | |
| 2006/0262519 A1 | 11/2006 | Hirschburger et al. | |
| 2007/0229027 A1 | 10/2007 | Roehm et al. | |
| 2009/0065225 A1 | 3/2009 | Forster et al. | |
| 2010/0074700 A1 | 3/2010 | Canino et al. | |
| 2015/0309640 A1 | 10/2015 | Vuckovic | |
| 2016/0354888 A1 | 12/2016 | Huber et al. | |
| 2017/0284078 A1 | 10/2017 | Puzio et al. | |
| 2019/0035088 A1 | 1/2019 | Legrand | |
| 2019/0126456 A1 | 5/2019 | Abbott et al. | |
| 2019/0285257 A1 | 9/2019 | Gall et al. | |
| 2020/0056768 A1 | 2/2020 | Dorman et al. | |
| 2020/0114502 A1 | 4/2020 | Goble | |

FOREIGN PATENT DOCUMENTS

| | | |
|---|---|---|
| CN | 210567875 U | 5/2020 |
| CN | 211203812 U | 8/2020 |
| DE | 29807070 U1 | 6/1998 |
| DE | 20102138 U1 | 6/2001 |
| DE | 102008003484 A1 | 7/2009 |
| DE | 102014221760 A1 | 4/2016 |
| DE | 102014226025 A1 | 6/2016 |
| DE | 102015218447 A1 | 6/2016 |
| DE | 102019111973 A1 | 5/2020 |
| DE | 102019111970 A1 | 11/2020 |
| EP | 2201289 A1 | 6/2010 |
| EP | 1882553 B1 | 9/2011 |
| EP | 3517249 A1 | 7/2019 |
| EP | 3551389 A1 | 10/2019 |
| EP | 3749925 A1 | 12/2020 |
| FR | 2929543 A1 | 10/2009 |
| JP | 2512328 B2 | 9/1996 |
| JP | H1044064 A | 2/1998 |
| JP | 2004341451 A | 12/2004 |
| JP | 3936601 B2 | 3/2007 |
| JP | 2009214239 A | 9/2009 |
| JP | 5452276 B2 | 1/2014 |
| JP | 5880924 B2 | 2/2016 |
| WO | 2008133317 A1 | 11/2008 |
| WO | 2019035088 A1 | 2/2019 |
| WO | 2020230454 A1 | 11/2020 |

* cited by examiner

LIGHT EMITTING ASSEMBLY FOR A POWER TOOL

CROSS REFERENCE TO RELATED APPLICATION

This application is a continuation application of U.S. patent application Ser. No. 17/661,432, filed Apr. 29, 2022, and titled "Light Emitting Assembly For A Power Tool," which claims priority to U.S. Provisional Application No. 63/201,611, filed May 6, 2021, and titled "Pivoting Light Emitting Assembly For A Power Tool," both of which are incorporated by reference herein in their entireties.

TECHNICAL FIELD

This description relates to a light emitting assembly for a power tool.

BACKGROUND

Certain power tools may have a light assembly for illuminating a workpiece. Certain power tools may have a separate light assembly for indicating a condition or a parameter of power tool operation.

SUMMARY

According to one general aspect, a power tool includes a housing containing a motor, an output member configured to be driven by the motor to perform an operation on a workpiece, and a handle having a first end portion coupled to the housing and a second end portion. A base is coupled to the second end portion of the handle. A light emitting assembly is pivotably coupled to the base. The light emitting assembly is configured to be operable in a first mode to illuminate the workpiece and a second mode to indicate a condition of the power tool responsive to the power tool signaling the condition to the light emitting assembly.

Implementations may include one or more of the following features. For example, the light emitting assembly may include a first light unit that illuminates in the first mode and a second light unit that illuminates in the second mode. In some implementations, the first light unit comprises a first LED. In some implementations, the second light unit comprises a plurality of second LEDs. In some implementations, the light emitting assembly includes an isolator that isolates an illumination of the first light unit from an illumination of the second light unit. In some implementations, the light emitting assembly includes a front surface that faces generally toward the workpiece and a top surface transverse to the front surface that faces generally toward the housing. In some implementations, in the second mode, the second light unit illuminates through both the front surface and the top surface of the light emitting assembly. In some implementations, the top surface includes indicia with a transparent or translucent portion through which the second light unit illuminates in the second mode. In some implementations, in the first mode, the first light unit illuminates only through the front surface of the light emitting assembly.

In some implementations, the light emitting assembly includes an isolator configured to isolate light from the first light unit from light from the second light unit. In some implementations, the isolator is configured to direct light from the first light unit toward the front surface and to direct light from the second light unit toward the front surface and the top surface.

In some implementations, the first light unit has a first light quality and the second light unit has a second light quality that is different from the first light quality. In some implementations, the first light quality includes a first color and the second light quality includes a second color that is different from the first color. In some implementations, the first light quality includes a first brightness and the second light quality includes a second brightness that is different from the first brightness. In some implementations, the first light quality includes a steady light and the second light quality includes a flashing light.

In another aspect, a power tool includes a housing containing a motor, an output member configured to be driven by the motor to perform an operation on a workpiece, a handle having a first end portion coupled to the housing and a second end portion, and a base coupled to the second end portion of the handle. The power tool includes a light emitting assembly coupled to the base and includes a front surface that faces generally toward the workpiece and a top surface transverse to the front surface that faces generally toward the housing. The light emitting assembly is configured to be operable in a first mode in which light having a first light quality that is emitted only from a front surface of the light emitting assembly toward the workpiece to illuminate the workpiece and in a second mode in which light having a second light quality is emitted from both the front surface and the top surface of the light emitting assembly.

Implementations may include one or more of the following features. For example, the light emitting assembly may include a first light unit that illuminates in the first mode, a second light unit that illuminates in the second mode, and an isolator configured to isolate light from the first light unit from light from the second light unit. In some implementations, the second mode may indicate a condition of the power tool responsive to the power tool signaling the condition to the light emitting assembly.

In another general aspect, a power tool includes a housing containing a motor, an output member configured to be driven by the motor to perform an operation on a workpiece, a handle having a first end portion coupled to the housing and a second end portion, and a base coupled to the second end portion of the handle. The power tool includes a light emitting assembly coupled to the base and including a front surface that faces generally toward the workpiece, a top surface transverse to the front surface that faces generally toward the housing, a first light unit received in the light emitting assembly, a second light unit received in the light emitting assembly, and an isolator received in the light emitting assembly. The isolator is configured to direct light from the first light unit toward the front surface, to direct light from the second light unit toward the front surface and the top surface, and to isolate the light from the first light unit from the light from the second light unit.

Implementations may include one or more of the following features. For example, the light emitting assembly may be configured to be operable in a first mode to illuminate the workpiece and a second mode to indicate a condition of the power tool responsive to the power tool signaling the condition to the light emitting assembly.

The details of one or more implementations are set forth in the accompanying drawings and the description below. Other features will be apparent from the description and drawings, and from the claims.

DETAILED DESCRIPTION

This document describes a light emitting assembly coupled to a power tool that has both an illumination function to illuminate a workpiece and a separate indicator function to indicate a condition or parameter encountered during operation of the power tool. The light emitting assembly includes a combination of an illumination light unit (e.g., one or more LEDs) to illuminate a workpiece or work area and an indicator light unit (e.g., one or more LEDs) to indicate a condition or parameter encountered by the power tool, where the indicator light unit is visible to the end user. That is, the end user does not need to remove the power tool from the workpiece or its current position to see the indicator light unit, which indicates a condition or parameter encountered by the power tool. The light emitting assembly may emit light from multiple surfaces of the light emitting housing portion of the light emitting assembly.

As mentioned above, the indicator function on the light emitting assembly is configured to illuminate when a condition or parameter is encountered during operation of the power tool. In one example implementation, when the power tool encounters a kickback of the tool housing if the bit binds in the workpiece or if the user loses control of the tool, the power tool is designed to shut off power to the motor in response to detecting such a condition. When this condition is encountered, the indicator function on the light emitting assembly illuminates in a manner such that the indication is visible to the end user. The light emitting assembly may use different color LEDs to distinguish between the illumination function and the indicator function. In some implementations, the assembly may use a different pattern of light sequences to indicate different conditions encountered during operation of the power tool such that the end user can determine the particular condition from the specific light pattern being made visible to the end user. These and other features are described in more detail below with respect to the figures and the claims.

Figure 1:
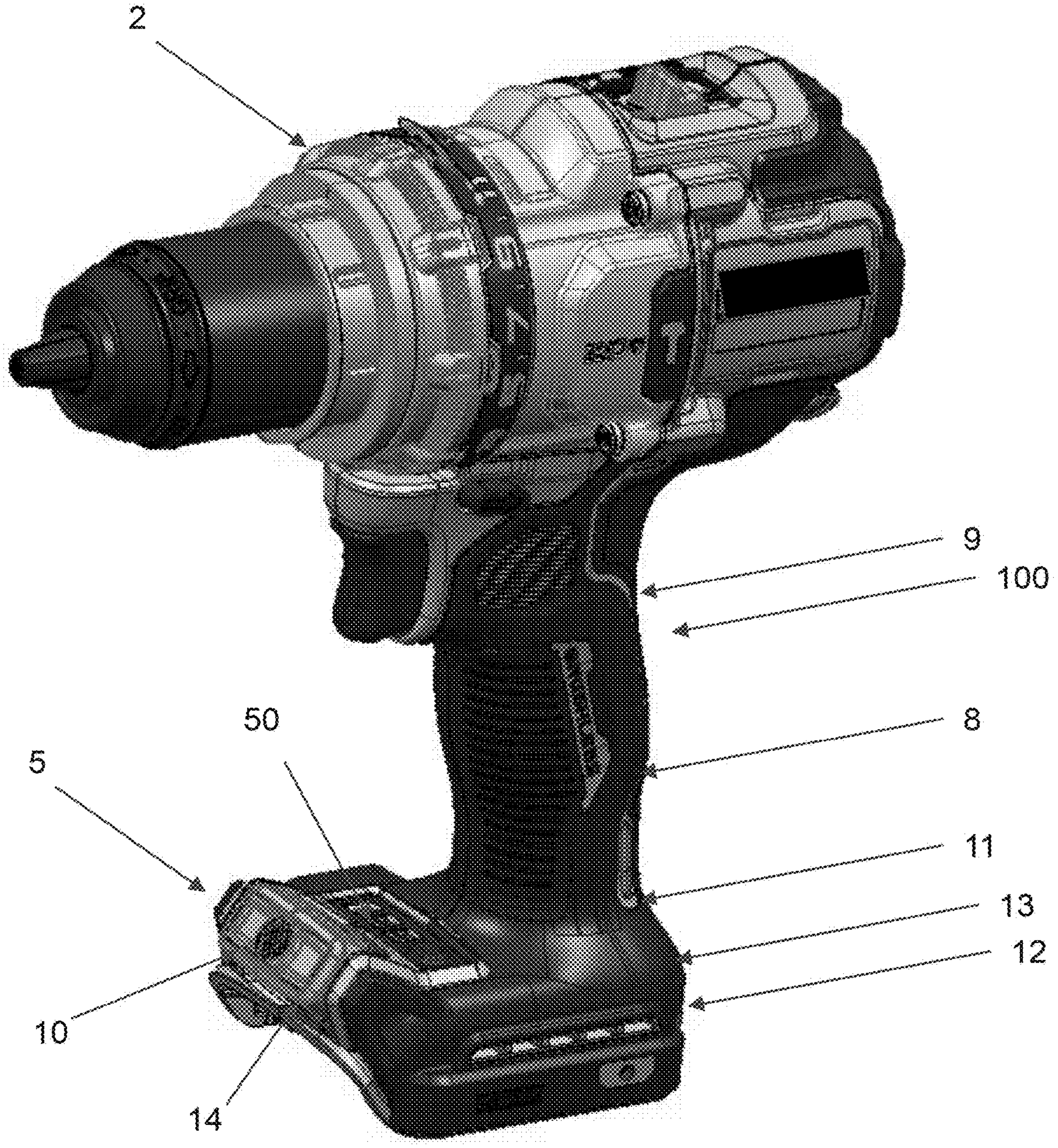
FIG. 1 is a perspective view of an example power tool having a light emitting assembly according to an example implementation.

FIG. 1 is an example power tool 100 having a light emitting assembly 5 according to an example implementation. The power tool 100 includes, among other components, a housing 2 containing a motor (not shown), an output member (e.g., a chuck) configured to be driven by the motor to perform an operation on a workpiece (e.g., drilling a hole or inserting a threaded fastener), a handle 8 having a first end portion 9 coupled to the housing and a second end portion 11, and a base 13 coupled to the second end portion 11 of the handle. The base 13 may include a battery receptacle portion 12 (also referred to as battery receptacle) configured to receive a battery for providing electrical energy to the power tool. The light emitting assembly 5 includes a light emitting housing 10 that may be pivotably coupled to the base 13 and, more specifically in some implementations, to the front of the battery receptacle 12 below the handle 8. The light emitting assembly 5 is configured to pivot within the base 13 through various angular positions. That is, the light emitting assembly 5 is rotatable by the end user within its position in the base 13. In this manner, the end user may rotate the light emitting assembly 5 through the various angular positions and direct the illumination from the light emitting assembly 5 at desired position such that it illumines a workpiece or work area. In some implementations, the light emitting assembly 5 may rotate freely within the base 13 through the range of angular positions. In some implementations, the light emitting assembly 5 may be include detents or stops for stopping rotation of the light emitting assembly at one or more discrete positions relative to the base 13. In this manner, the end user may retain the light emitting assembly 5 in a desired position. In yet other implementations, the light emitting assembly may not be pivotable and may have a fixed orientation relative to the base 13.

In some implementations, the base 13 may not include a battery receptacle 12. For example, in some implementations, the battery receptable 12 may be located elsewhere on the power tool 100. In some implementations, the power tool 100 may not include a battery receptacle. For instance, the power tool may include a built-in battery or the power tool may be a corded power tool without a battery.

While FIG. 1 illustrates the example power tool 100 as a drill/driver, it is understood that the light emitting assembly 5 may be incorporated into other power tools to provide both an illumination function and an indicator function, as described in this document. Other power tools may include, without limitation, hammer drills, rotary hammers, screwdrivers, impact drivers, impact wrenches, reciprocating saws, circular saws, grinders, polishers, nailers, and staplers.

Referring also to FIGS. 2*a*-6*b*, the light emitting housing 10 includes an enclosure 14 with pivot projections 16 on either side, a front window 18, and a top surface 20 with two openings 25 in the top surface 20. The two openings 25 in the top surface 20 enable light from one or more LEDs to shine through as part of the indicator function, as described in more detail below. Received in the enclosure 14 is a lens assembly 22, which includes a lens 30 and a lens holder 32. The lens 30 may form a front surface in the front window 18. The top surface 20 is transverse to the front surface formed by the lens 30 in the front window 18. The lens 30 includes a center lens portion 33 and two side lens portions 35. The lens and/or lens portions may comprise a transparent or translucent cover that may or may not refract, reflect, diffuse, focus, or otherwise treat light rays extending therethrough. Also received in the enclosure 14 and disposed behind the lens assembly 22 is a LED printed circuit board (PCB) and isolator assembly 36. The LED PCB and isolator assembly 36 includes an isolator 38, a LED PCB 40 with connector wires 42, and a heatsink 44. A rear housing cover 46 secures the lens assembly 22 and the LED PCB and isolator assembly 36 in the enclosure 14 of the light emitting housing 10.

Mounted or otherwise secured to the LED PCB 40 is a central illumination light unit 47 (e.g., one or more sufficiently bright white LEDs) and an indicator light unit (e.g., one more colored LEDs such as red LEDs) 48 disposed on lateral sides of the illumination light unit 47 outside the outer periphery of the center lens portion 33. The illumination light unit 47 may include a central white LED that aligns with and/or is centered with the center lens portion 33. The indicator light unit 48 may include two colored LEDs that align with the two side lens portions 35 with one colored LED aligning with one side lens portion. The center lens portion 33 may include a textured or honeycomb pattern on its front surface to help diffuse light from the illumination light unit 47.

Figure 2A:
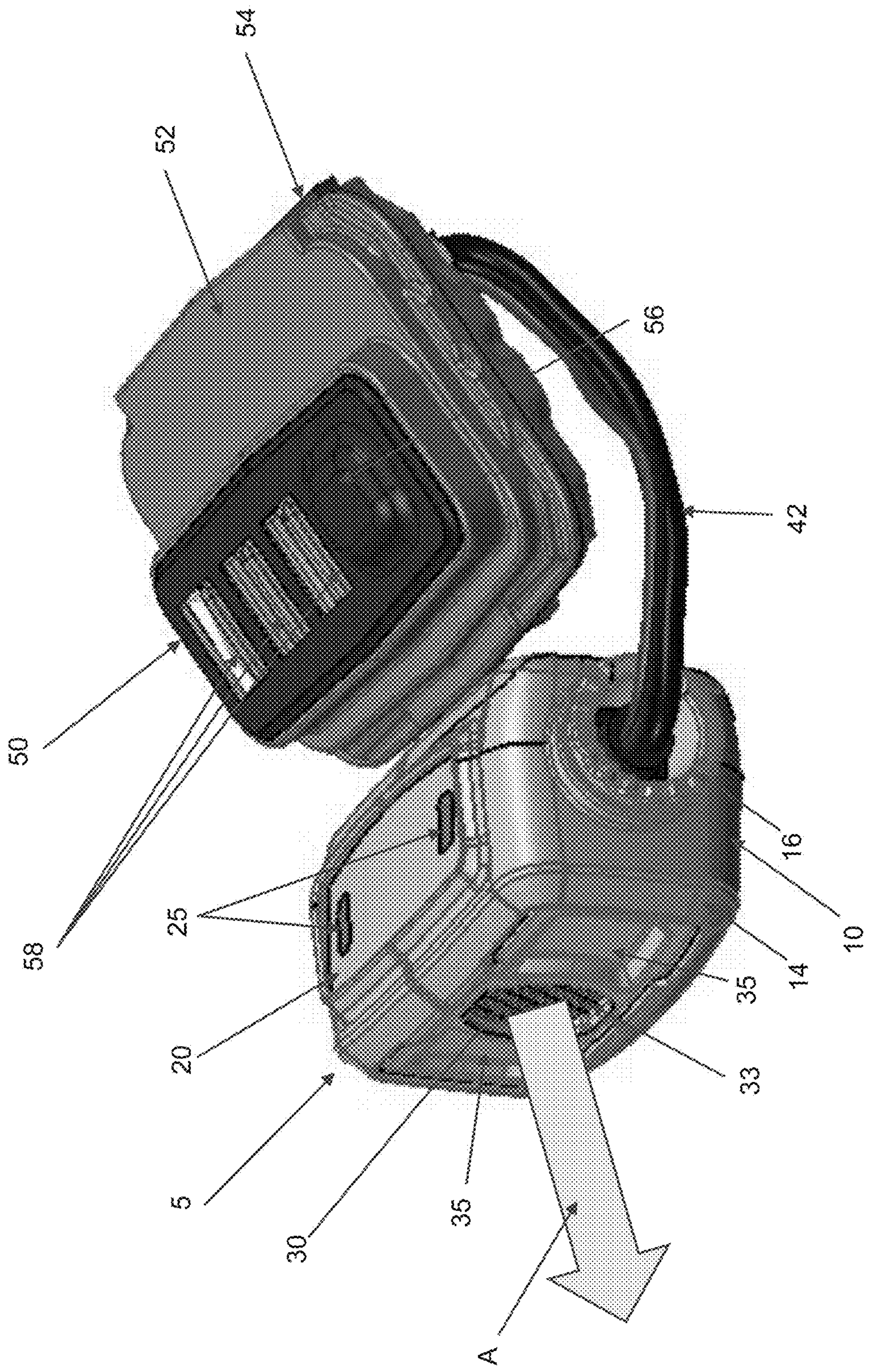
FIG. 2*a* is a perspective view the light emitting assembly and power tool user interface from the power tool of FIG. 1 in an example illumination mode.
Figure 2B:
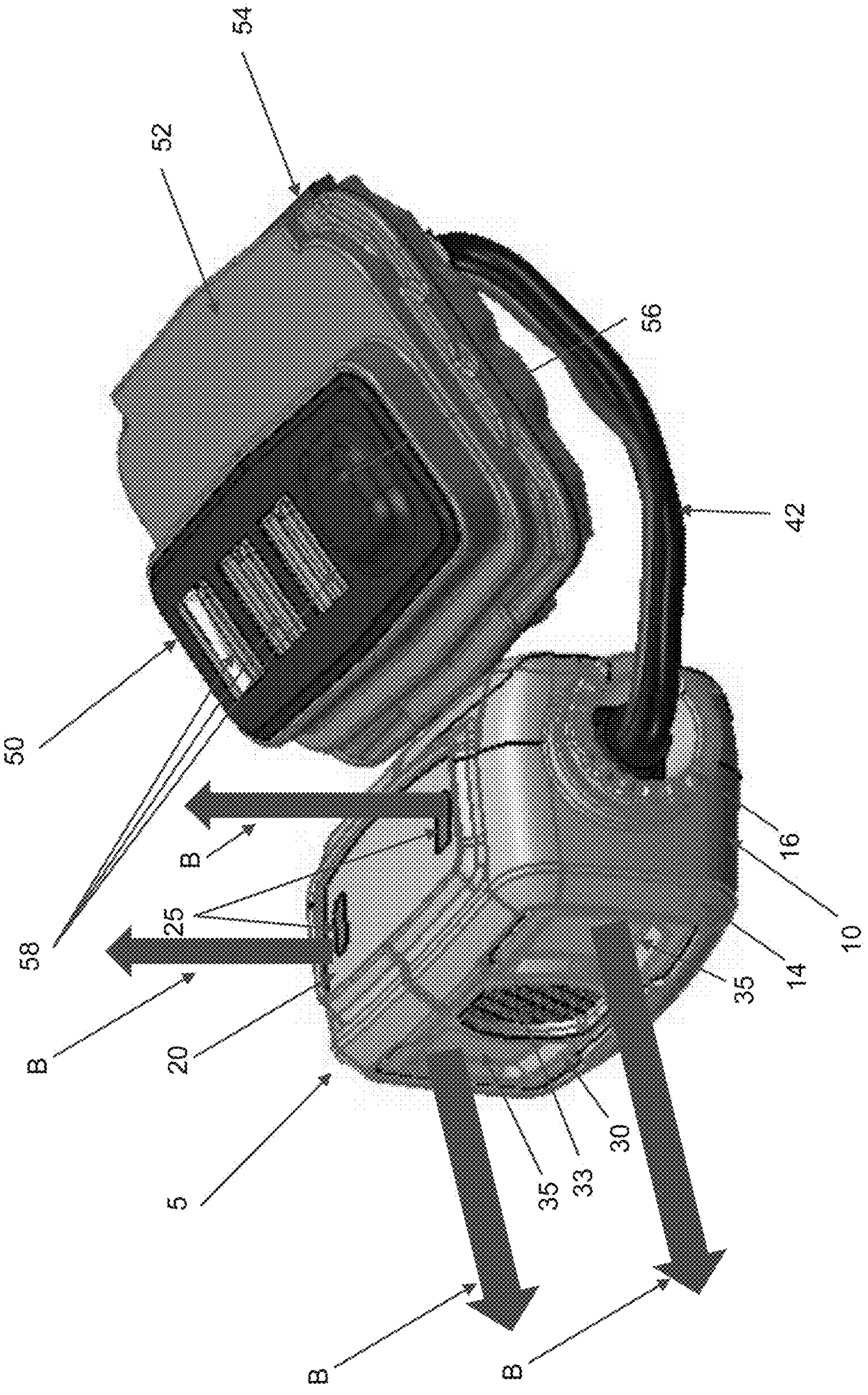
FIG. 2*b* is a perspective view the light emitting assembly and power tool user interface from the power tool of FIG. 1 in an example indicator mode.

Referring also to FIGS. 2*a* and 2*b*, the power tool 100 includes a user interface 50 to control the operation of the illumination mode of the light emitting assembly 5. The user interface 50 is disposed on the top surface of the battery receptacle 12 in a power tool PCB housing 52, which houses the power tool main control PCB 54. The LED PCB 40 connector wires 42 connect to the power tool main control PCB 54. The user interface 50 includes a selector button 56, which in some implementations may be a push button where multiple selections or depressions of the selector button 56 select and cycle through different illumination modes. The user interface 50 also includes one or more (e.g., 3) indicator LEDs 58 to indicate the different illumination modes.

The light emitting assembly 5 may be operable in an illumination mode (FIG. 2*a*) or an indicator mode (FIG. 2*b*). In the illumination mode, only the illumination light unit 47 with the white LED is illuminated as controlled through the selector button 56 on the user interface 50. White light shines through the center lens portion 33 substantially along arrow A in a spotlight fashion to illuminate a workpiece or work area. The illumination mode may include different illumination modes of operation as controlled by the end user through use of the selector button 56. For example, illumination modes of operation may include different levels (e.g., low, medium, high) of brightness of the illumination light unit 47, and different states of the white LED including steady on, flashing, pulsing, etc.

In the indicator mode, the colored LEDs in the indicator light unit 48 are illuminated (with or without the end user turning off the white LED in the illumination light unit 47 if it was on) so that the colored light shines through the lateral side lens portions 35 and the openings 25 of the top surface 20 along arrows B. In some implementations, as described in more detail below, indicia (which may include a label with one or more transparent or translucent openings) may be affixed to the top surface such that when the colored light shines through the openings 25 of the top surface 20, the indicia illuminates a message to the end user alerting the end user to the particular condition or parameter encountered by the power tool 100. In some implementations, the colored LEDs of the indicator light unit 48 illuminate a steady color that is both directed at the workpiece through the lateral side lens portions 35 and directed towards the end user through the openings 25 of the top surface 20. In some implementations, the colored LEDs of the indicator light unit 48 may flash or pulse to indicate the condition of the power tool 100 or the parameter encountered by the power tool 100. In some implementations, the colored LEDs of the indicator light unit 48 may both illuminate a steady light and flash or pulse. For instance, the colored LEDs of the indicator light unit 48 may illuminate a steady light through the lateral side lens portions 35 and a flashing or pulsing light through at least one of the openings 25 of the top surface 20 directed towards the end user. In some implementations, the indicator mode may include the illumination of both the white LED of the illumination light unit 47 and the colored LEDs of the indicator light unit 48.

The indicator mode is triggered by a condition of the power tool 100 and/or by a parameter encountered by the power tool 100. For example, when the power tool 100 encounters a condition such as a sensed tool kickback condition, the tool may automatically implement a protective action (e.g., reducing or stopping power delivered to the motor). When this occurs, a signal may be communicated from the main power tool control PCB 54 through one or more of the connector wires 42 to the LED PCB 40 to trigger the indicator mode, which causes illumination of the indicator light unit 48, and may also include turning off or reducing the brightness of the illumination light unit 47. The LED PCB 40 may include a controller or other processor component (not shown) to receive the signals from the selector button 56 to control the illumination mode and to receive the signals from the main power tool control PCB 54 to control the indicator mode. In some implementations, a controller or other processor component on the main power tool control PCB 54 may control the illumination mode and the indicator mode. The following U.S. patent documents describe detecting a tool kickback and implementing a protective action and are hereby incorporated by reference in their entirety: U.S. Pub. No. 2020/0114502, U.S. Pat. Nos. 7,410,006, and 8,316,958. Further, U.S. Pat. Pub. No. 2009/0065225 describes having an indicator LED for indicating when a kickback condition is sensed and is hereby incorporated by reference in its entirety. In other examples, it is understood that the colored LEDs of the indicator light unit 48 and/or white LED of the illumination light unit 47 may be programmed to illuminate in various combinations or patterns to indicate different types of conditions or parameters encountered by the power tool 100.

Figure 5:
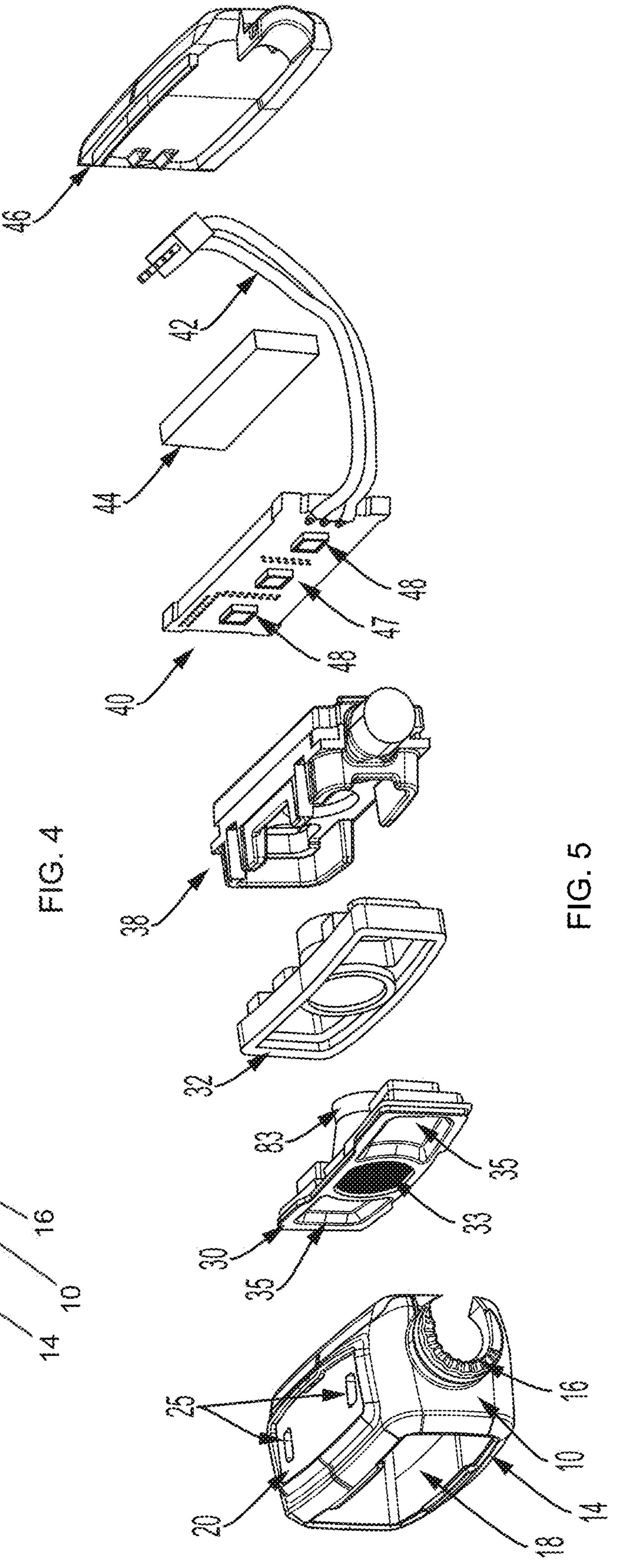
FIG. 5 is an exploded view of the light emitting assembly of FIG. 3 including an exploded view of the lens assembly and an exploded view of the PCB and isolator assembly.
Figure 6A:
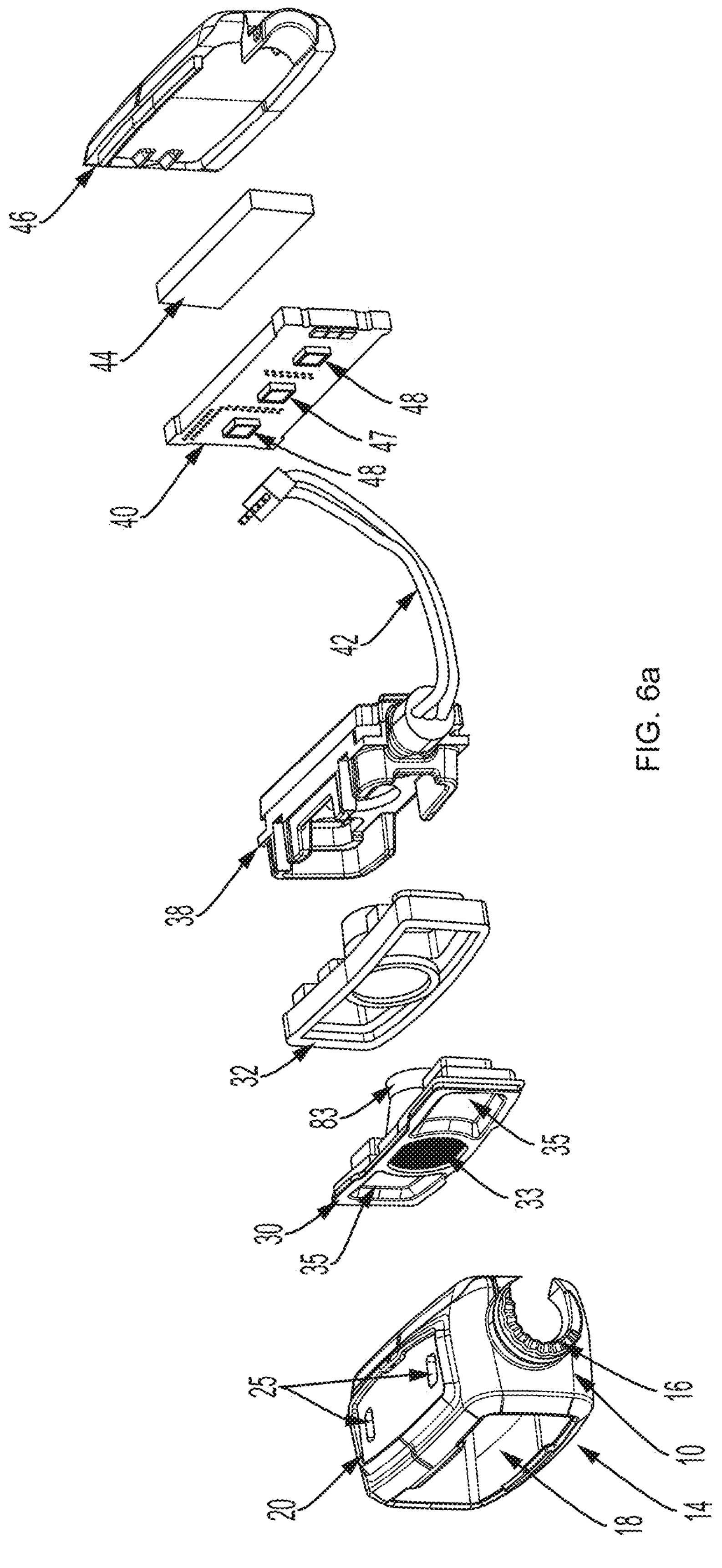
FIG. 6*a* is an exploded view of the light emitting assembly of FIG. 3 from the front housing perspective and including an assembled view of the isolator overmolded onto the LED PCB.
Figure 6B:
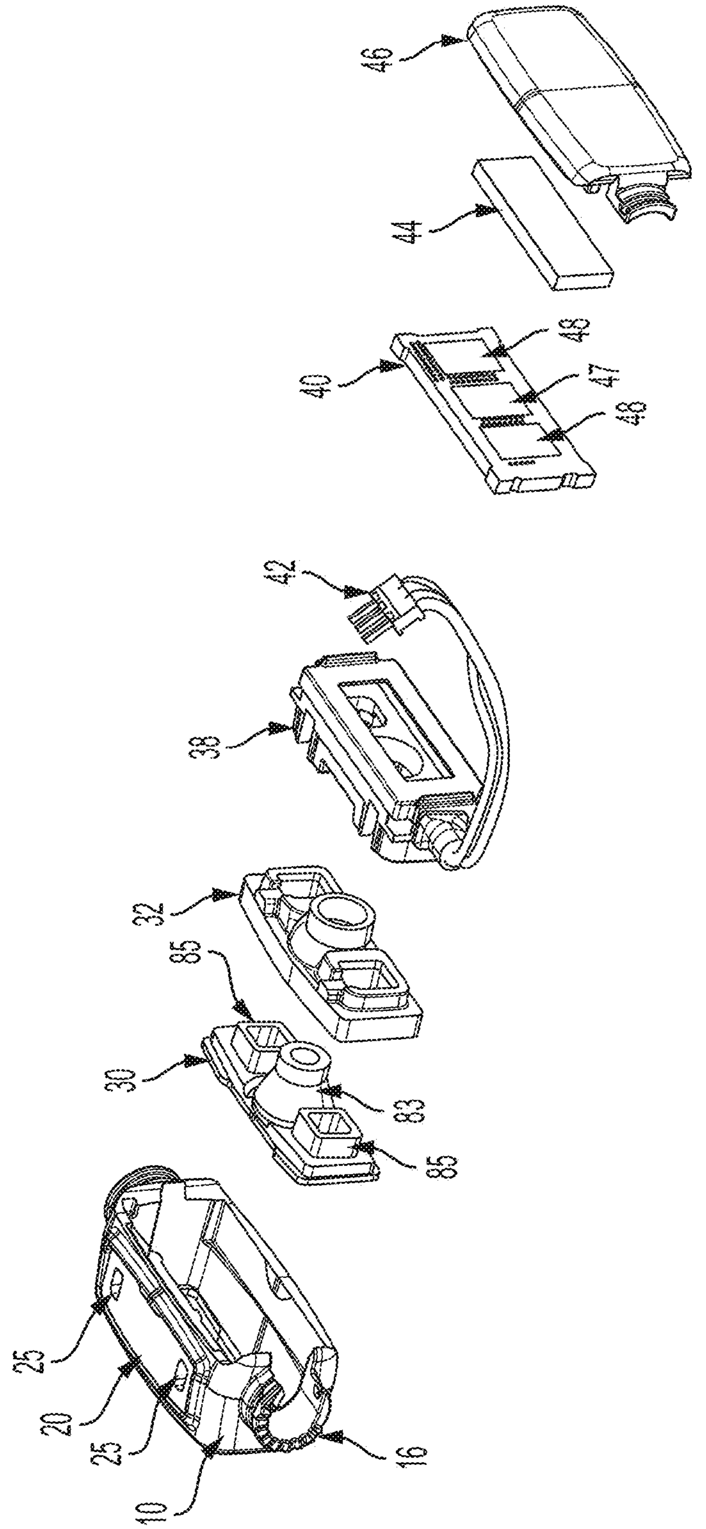
FIG. 6*b* is an exploded view of the light emitting assembly of FIG. 3 from the rear housing perspective and including an assembled view of the isolator overmolded onto the LED PCB.
Figure 7B:
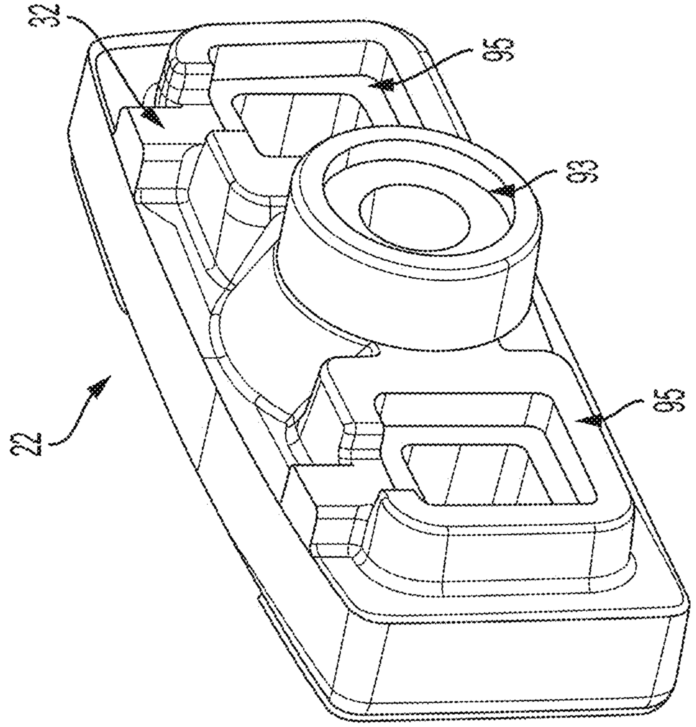
FIG. 7*b* is a rear perspective view of the lens assembly of FIG. 4.
Figure 7A:
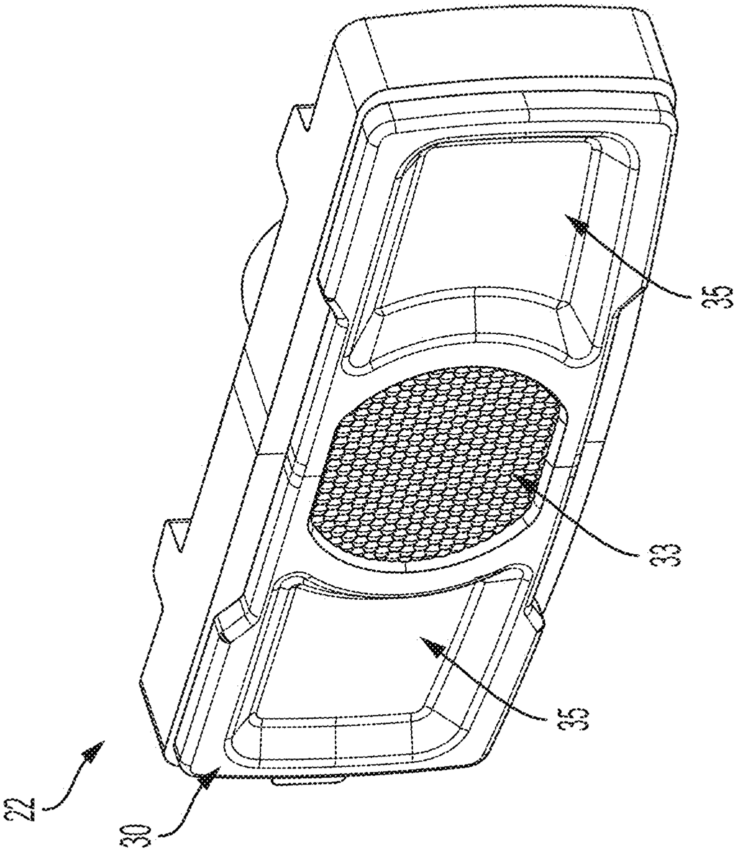
FIG. 7*a* is a front perspective view of the lens assembly of FIG. 4.
Figure 8B:
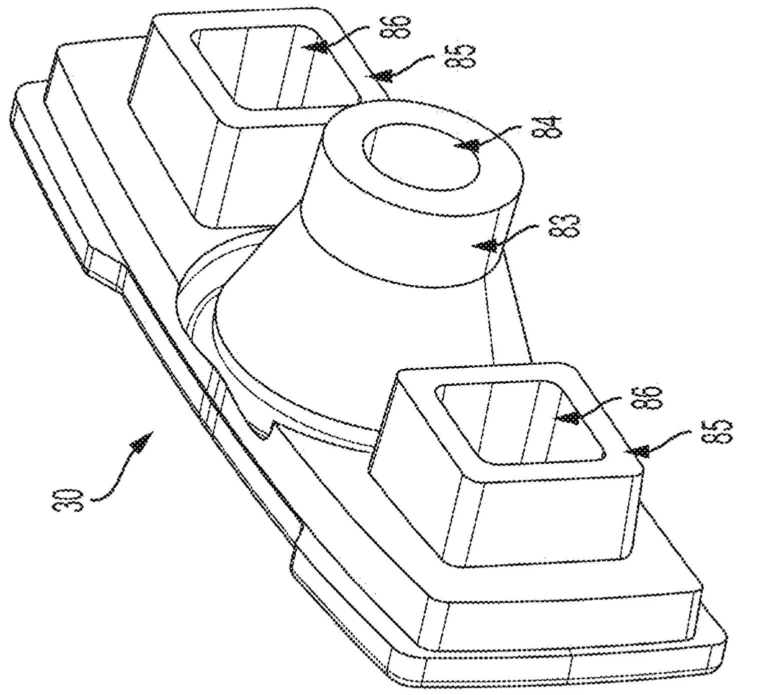
FIG. 8*b* is a rear perspective view of the lens of FIG. 7*b*.
Figure 8A:
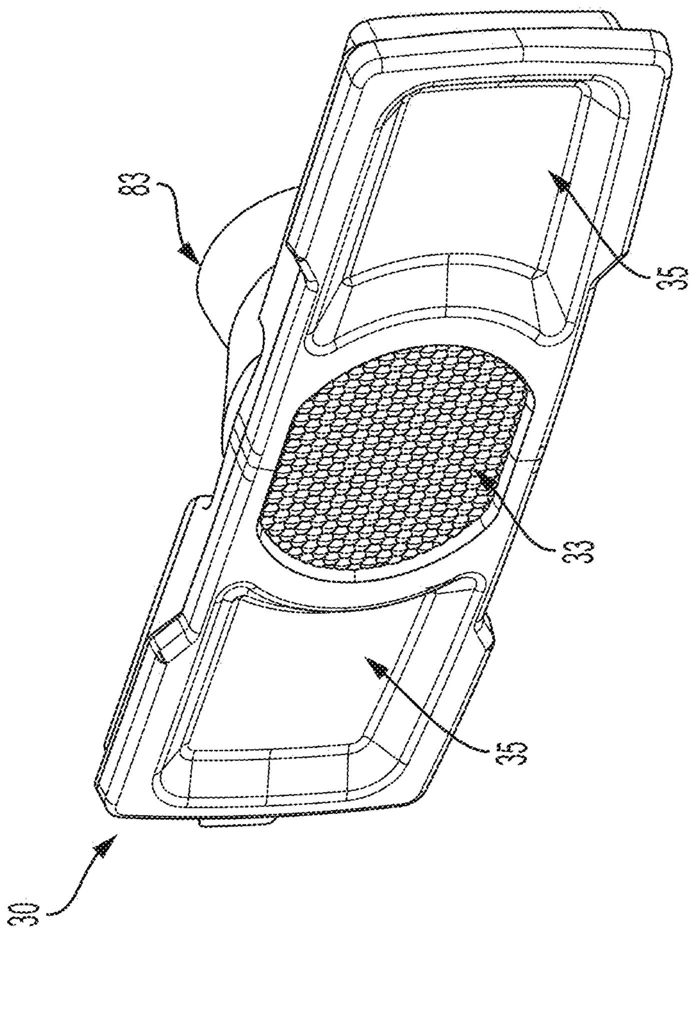
FIG. 8*a* is a front perspective view of the lens of FIG. 7*a*.
Figure 9B:
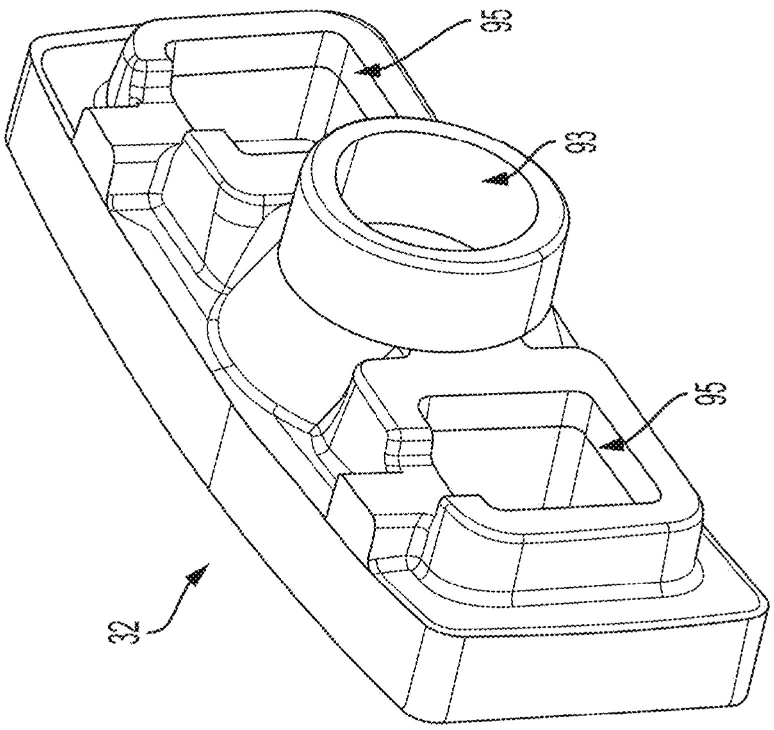
FIG. 9*b* is a rear perspective view of the lens holder of FIG. 7*b*.
Figure 9A:
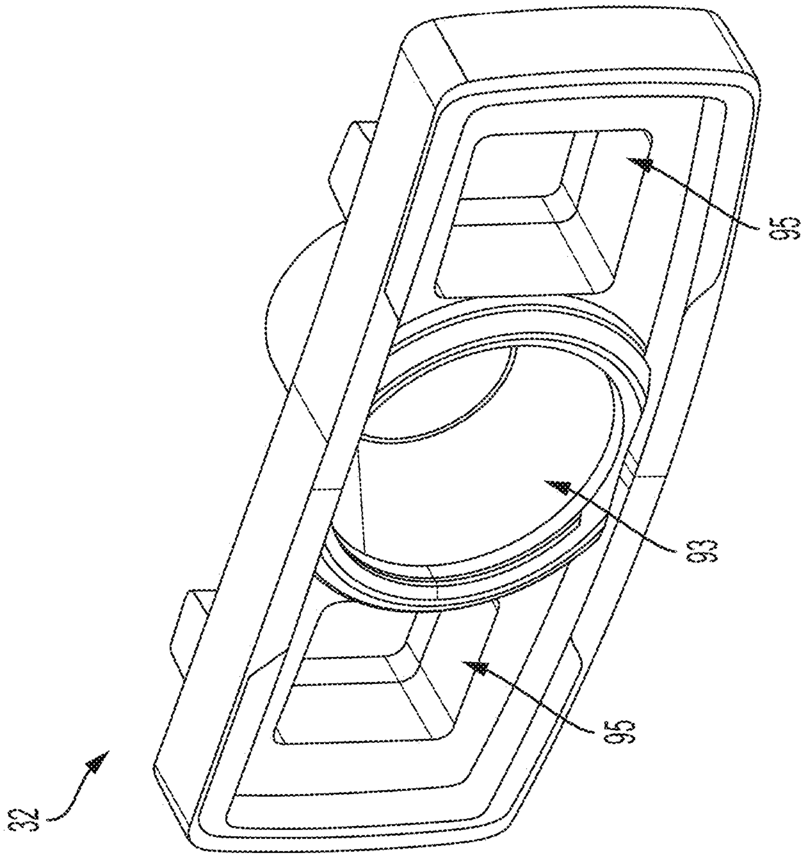
FIG. 9*a* is a front perspective view of the lens holder of FIG. 7*a*.

As shown in the exploded views of FIGS. 4-6*b*, the lens assembly 22 includes a lens 30 and a lens holder 32. In FIG. 5, the connector wires 42 are illustrated as being connected to and/or plugged in to the LED PCB 40. In FIGS. 6*a* and 6*b*, it is noted that the connector wires 42 are illustrated as connecting through the isolator 38, where they would be connected to the LED PCB 40 in its assembled form. Referring also to FIGS. 7*a*-9*b*, FIGS. 7*a* and 7*b* illustrate the lens assembly 22 in more detail, FIGS. 8*a* and 8*b* illustrate the lens 30 in more detail, and FIGS. 9*a* and 9*b* illustrate the lens holder 32 in more detail. The lens assembly 22, including both the lens 30 and the lens holder 32, may be configured to create the desired lighting effects for the illumination and indicator modes. The lens assembly 22 may enable control over the beam(s) of light emitted from the illumination light unit 47 and/or the indicator light unit 48. The lens assembly 22, in combination with the LED PCB and isolator assembly 36, protects LEDs on the LED PCB 40. The lens assembly 22 provides the optics to distribute and focus the light emitting from the illumination light unit 47 and the indicator light unit 48. In some implementations, the lens assembly 22 may be formed using plastic components for the lens 30 and the lens holder 32 with the lens 30 being created in a first shot of plastic during a manufacturing process and the lens holder 32 being created in a second shot of plastic during the manufacturing process. The lens 30 may be made of a transparent plastic to form the lens 30 and the lens holder 32 may be made of an opaque plastic that surrounds the lens 30.

As discussed above, the lens 30 includes a center lens portion 33 and two side lens portions 35. The center lens portion 33 may include a conical lens 83 or conical-shaped lens with an opening 84 at the rear side of the conical lens to enable the light from the illumination light unit 47 to shine through the conical lens 83. The conical lens 83 distributes and focuses the light from the illumination light unit 47. The two side lens portions 35 may include square lenses 85 or square-shaped lenses with openings 86 to enable the light from the indicator light unit 48 to shine through the square lens 85. The square lenses 85 distribute and focus the light from the colored LEDs of the indicator light unit 48. The entire lens 30, including the center lens portion and the side lens portions may be formed by a single injection molded piece of transparent or translucent plastic.

The lens holder 32 may be overmolded on the lens 30. The lens holder 32 includes features that match the shape and contour of the lens 30 to protect and cover the conical lens 83 and the square lenses 85. The lens holder 32 includes a conical portion 93 to cover and protect the conical lens 83 and two square portions 95 to cover and protect the square lenses 85. The conical lens 83 and the conical portion 93 function to direct the light from the white LED of the illumination light unit 47 in a forward direction only through the center lens portion 33 and not through the top surface 20 or the openings 25 on the top surface 20. The conical portion 93 and the square portions 95 include openings to enable the light from the LEDs to shine through them. It is understood that the lens shapes of the lens 30 and the corresponding shapes on the lens holder 32 are examples and that other lens shapes and corresponding shapes may be used.

As shown in the exploded views of FIGS. 4-6*b*, the LED PCB and isolator assembly 36 includes the isolator 38, the LED PCB 40, and the heatsink 44. Referring also to FIGS. 10*a*-11*b*, FIGS. 10*a* and 10*b* illustrate the isolator 38 overmolded on the LED PCB 40 in more detail and FIGS. 11*a* and 11*b* illustrate the isolator 38. In some implementations, the LED PCB 40 and the heatsink 44 are fastened together, for example, by gluing the LED PCB 40 and the heatsink 44 together. The isolator 38 is overmolded onto the combined LED PCB 40 and the heatsink 44 and covers the combined LED PCB 40 and the heatsink 44.

Figure 10B:
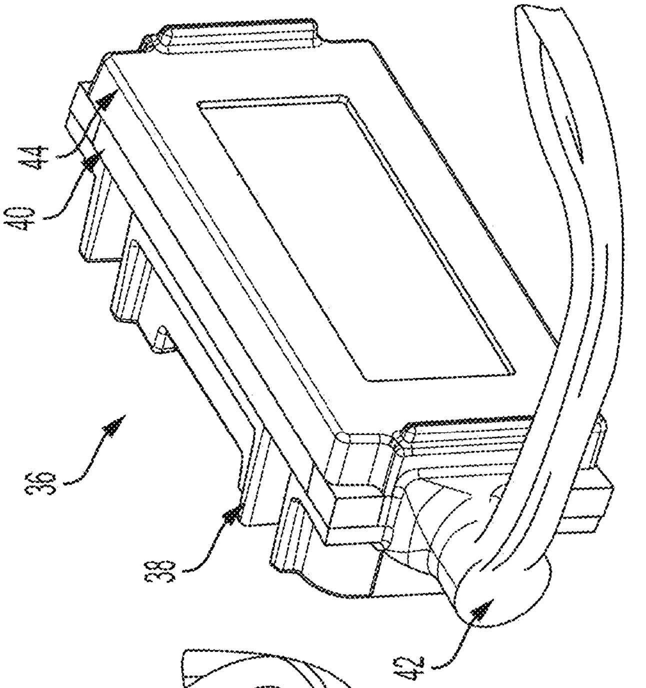
FIG. 10*b* is a rear perspective view of the isolator overmolded onto the LED PCB of FIG. 4.
Figure 10A:
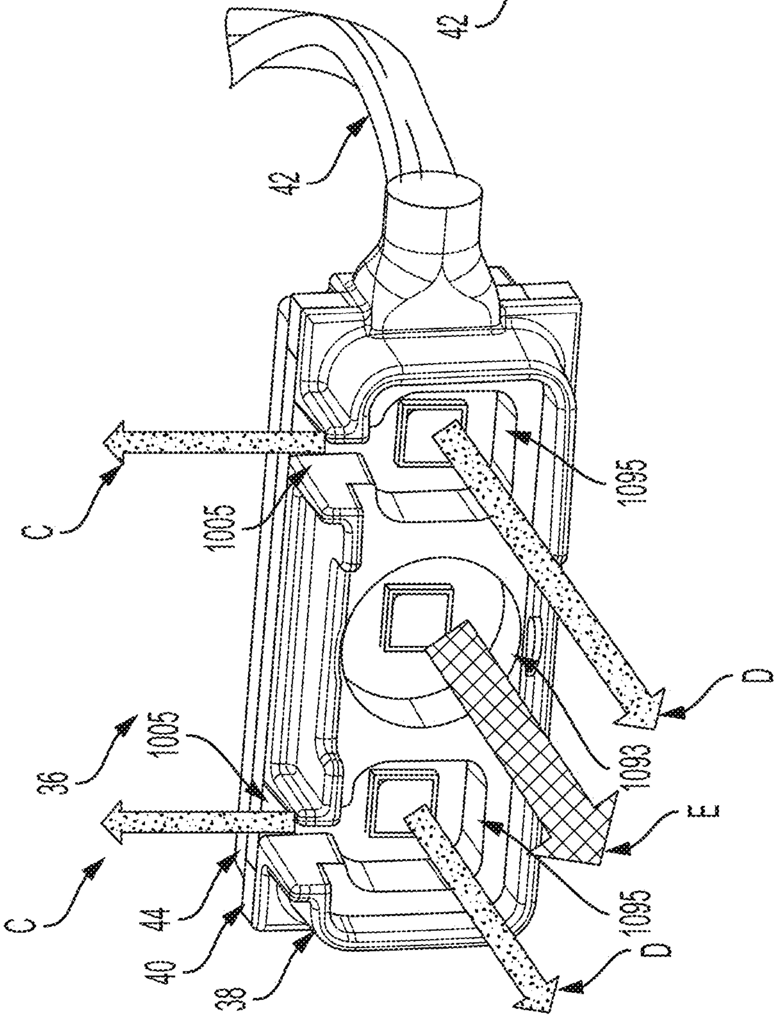
FIG. 10*a* is a front perspective view of the isolator overmolded onto the LED PCB of FIG. 4.
Figure 11B:
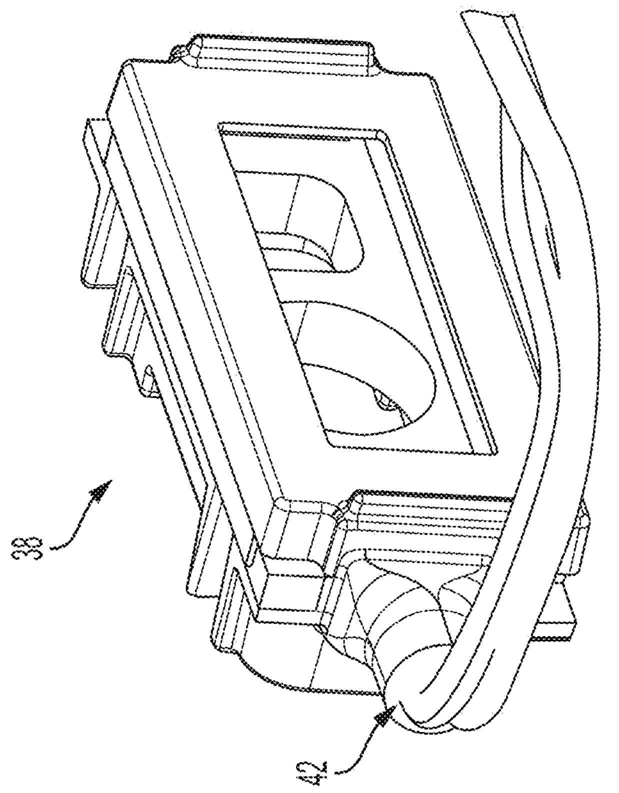
FIG. 11*b* is a rear perspective view of the isolator of FIG. 10*b*.
Figure 11A:
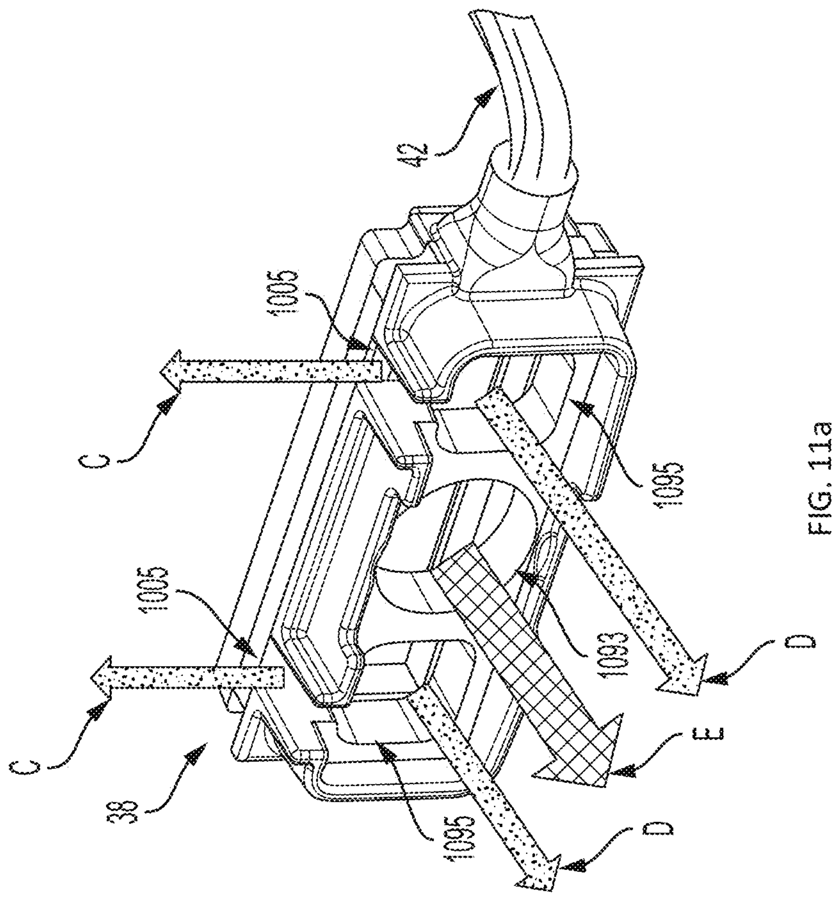
FIG. 11*a* is a front perspective view of the isolator of FIG. 10*a*.

Referring to FIGS. 10*a*-10*b*, the isolator 38 is shaped to match the shape and contours of the lens holder 32 so that the features of the isolator 38 and the lens holder 32 match to fit together in the housing 10. For example, the isolator 38 includes a circular portion 1093 and two square portions 1095 to match the conical portion 93 and the two square portions 95 on the lens holder 32. The isolator 38 directs the light from the LEDs in desired directions. In this manner, the isolator 38 isolates the light emitted for the illumination mode from the white LED of the illumination light unit 47 from the light emitted for the indicator mode from the colored LEDs of the indicator light unit 48. Walled surfaces are used on the isolator 38 to form the conical portion 1093 and the square portions 1095, which act to block the light from shining in certain portions and direct the light in specific directions, as indicated by the arrows C, D, and E in FIG. 10*a* and FIG. 11*a*. The isolator 38 includes two openings 1005 to direct the colored light from the colored LEDs of the indicator light unit 48 through the openings 25 in the top surface 20, as indicated by the arrows C. The openings in the square portions 1095 direct the colored light from the colored LEDs of the indicator light unit 48 through the two side lens portions 35, as indicated by the arrows D. The opening in the conical portion 1093 direct the white light from the white LED of the illumination light unit 47 through the center lens portion 33, as indicated by the arrow E.

In some implementations, the illumination light unit 47 may emit light having a first light quality and the indicator light unit 48 may emit light having a second light quality, where the second light quality is different than the first light quality. As one example, as discussed above, the first light quality may one color (e.g., white) and the second light quality may be a different color (e.g., red). As another example, the first light quality may be a first brightness level and the second light quality may be a second brightness level that is different than the first brightness level. As another example, the first light quality may include a steady light and the second light quality may include a flashing light.

Figure 3:
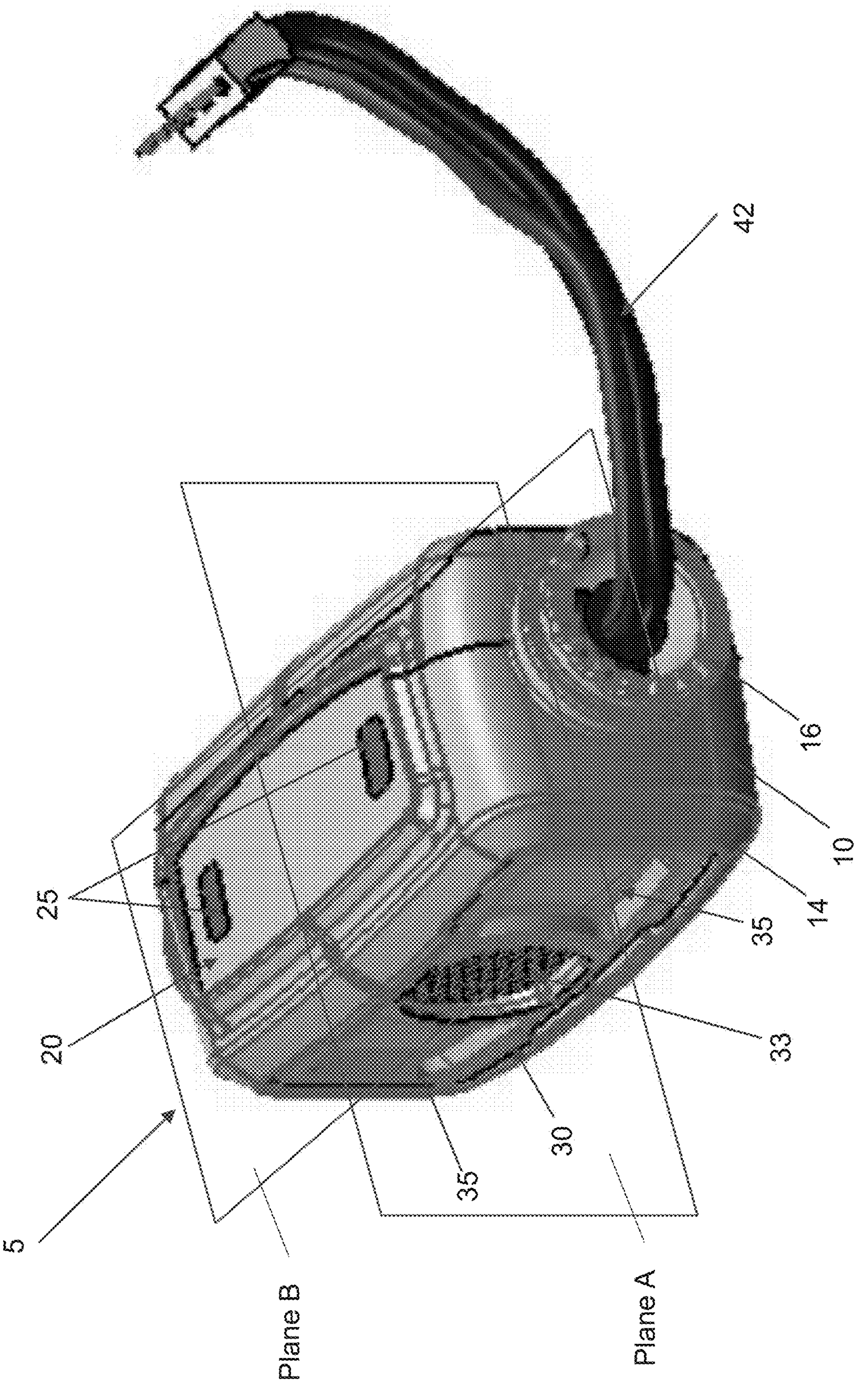
FIG. 3 is a perspective view the light emitting assembly from the power tool of FIG. 1.
Figure 4:
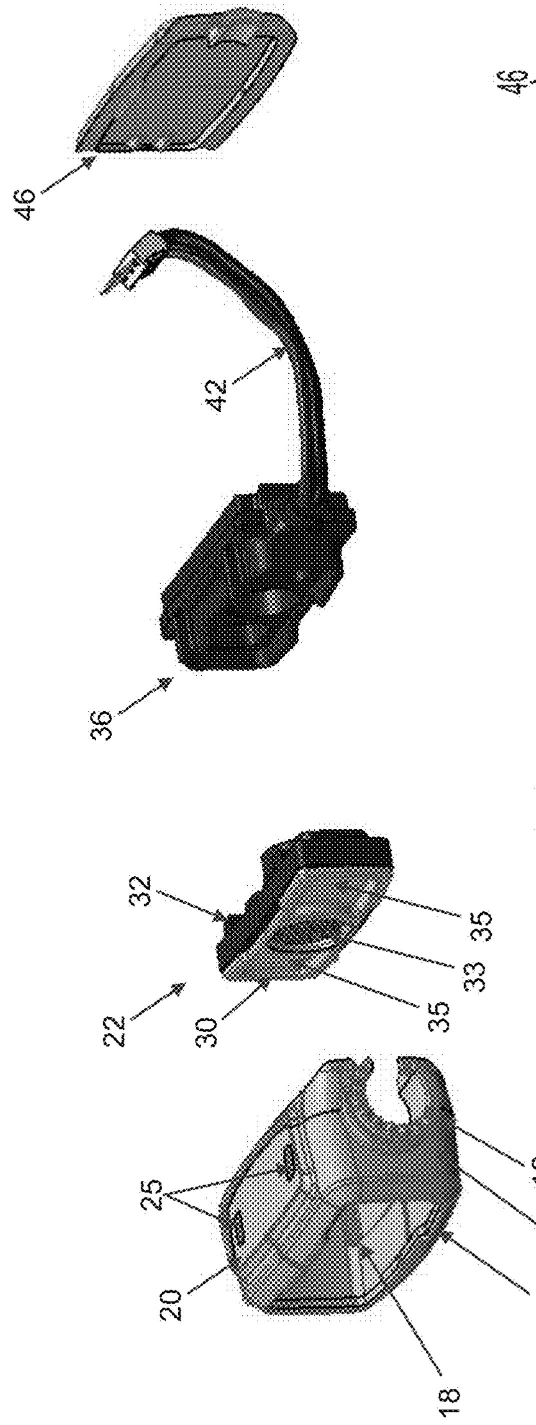
FIG. 4 is an exploded view of the light emitting assembly of FIG. 3 including an assembled view of the lens assembly and an assembled view of the PCB and isolator assembly.
Figure 12B:
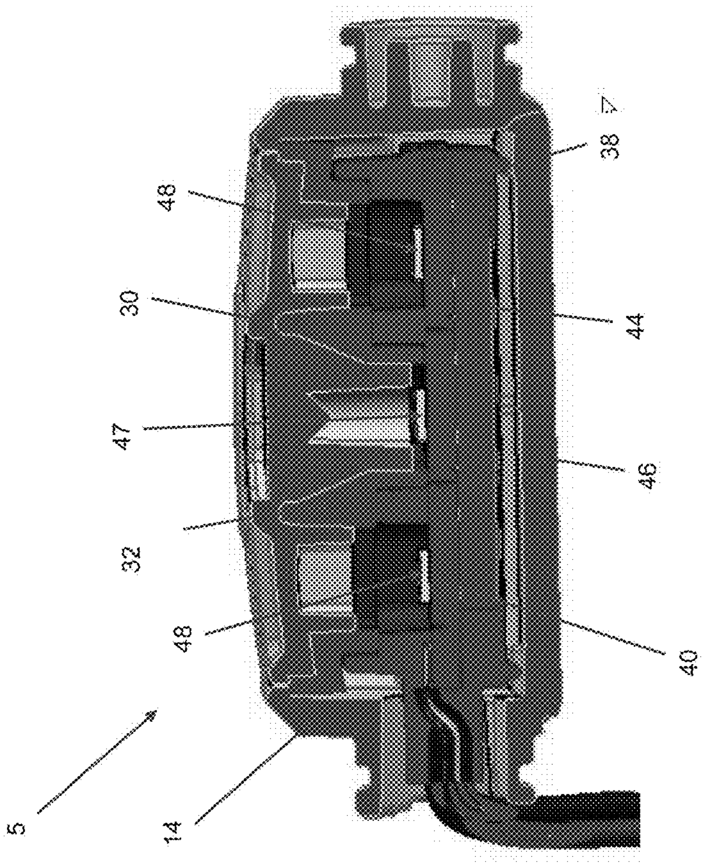
FIG. 12*b* is a cross section view of the lens assembly of FIG. 3 taken along Plane B.
Figure 12A:
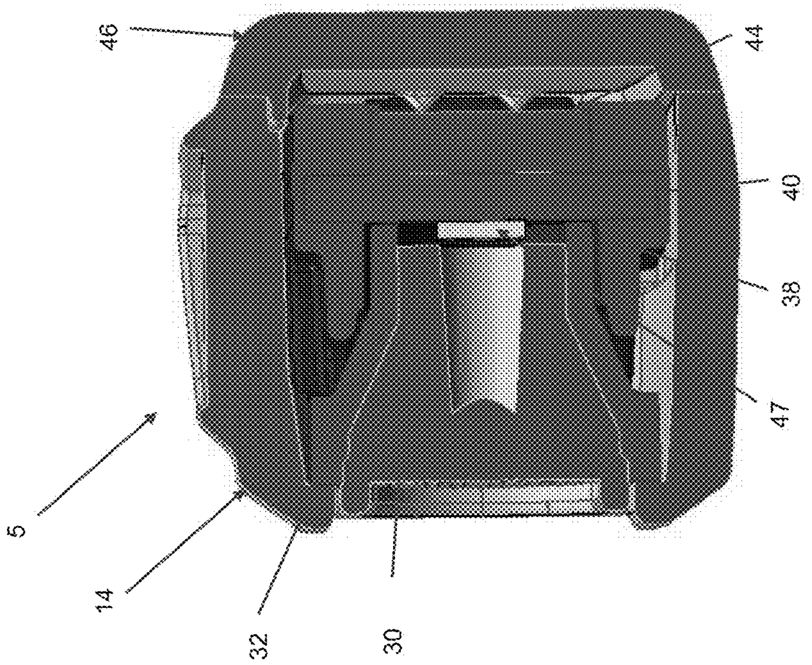
FIG. 12*a* is a cross section view of the lens assembly of FIG. 3 taken along Plane A.
Figure 13B:
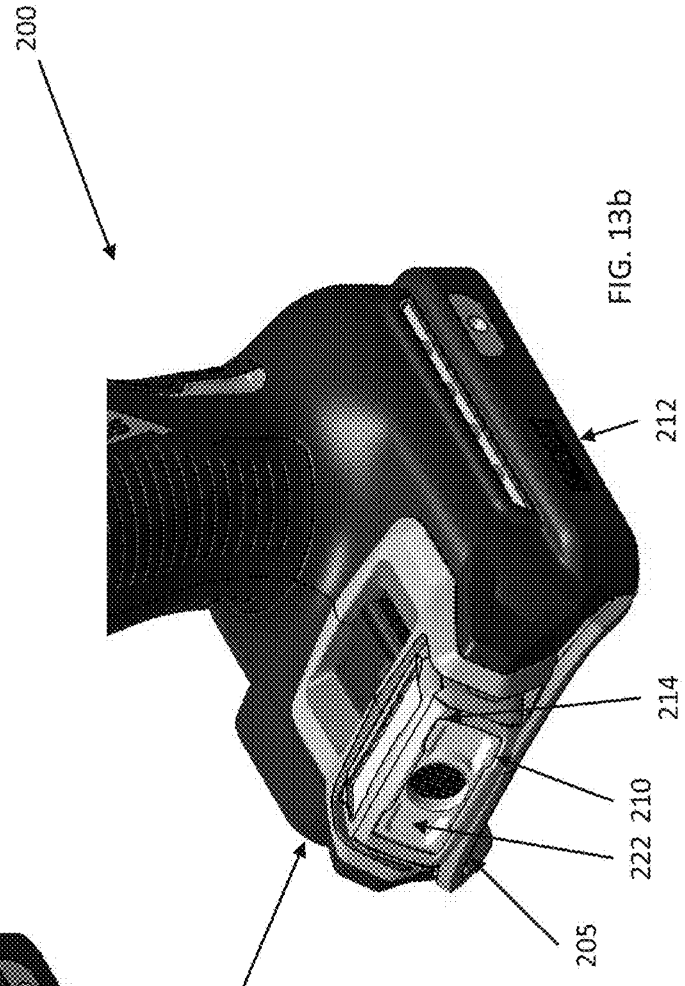
FIGS. 13*a* and 13*b* illustrate another example power tool having a light emitting assembly according to another example implementation.
Figure 13A:
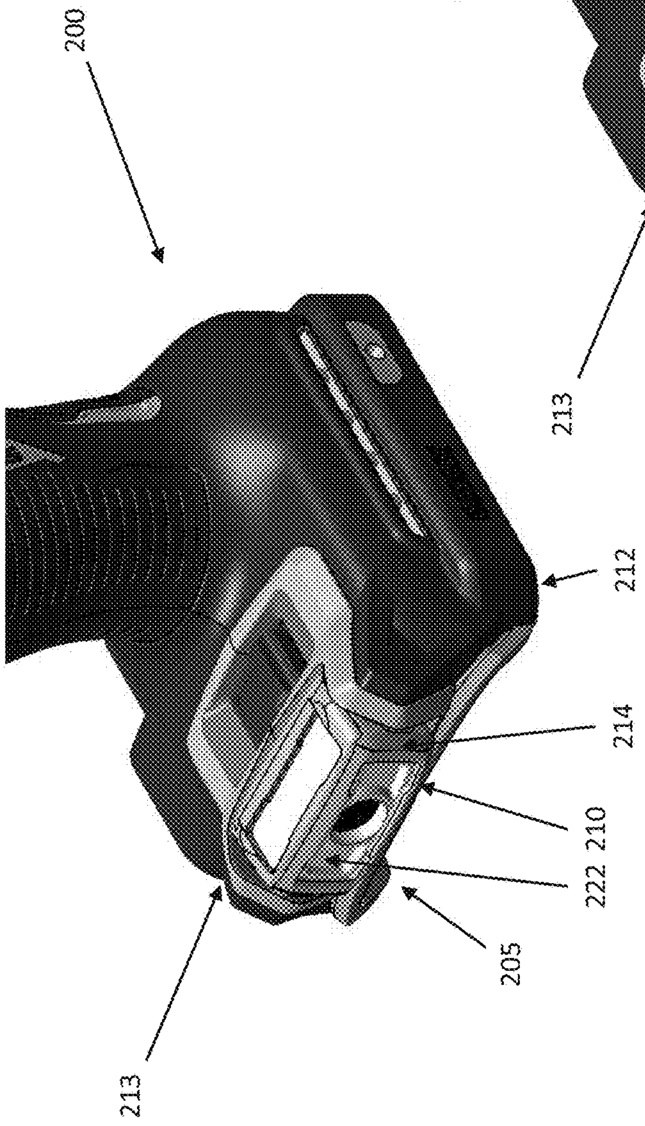

Referring to FIGS. 12*a* and 12*b*, FIG. 12*a* is a cross section view of the lens assembly of FIG. 3 taken along Plane A and FIG. 12*b* is a cross section view of the lens assembly of FIG. 3 taken along Plane B. The cross section view illustrate the assembled components of the light emitting assembly 5, as described above.

Referring to FIGS. 13*a*-15*b*, another example implementation of a light emitting assembly 205 in a power tool 200 is illustrated. The light emitting assembly 205 is similar to the light emitting assembly 5 of FIG. 1 with the following differences. In this example, the lens of the light emitting assembly 205 may be an L-shaped lens or an approximately right angle lens.

The light emitting assembly 205 has a light emitting housing 210 that is pivotably coupled to the front of the base 213 below the handle. More specifically, in some implementations, the light emitting housing 210 may be coupled to the battery receptacle portion 212 of the base 213. The light emitting housing 210 includes an enclosure 214 with pivot projections 216 on either side, a front window 218, and a top window 220. Received in the enclosure is a transparent or translucent L-shaped lens or clear cover 222 with a front portion 224 received in the front window 218 and a top portion 226 received in the top window. The front portion 224 of the clear cover 222 has a central opening 228 that receives a conical transparent or translucent LED lens 230.

Figure 14B:
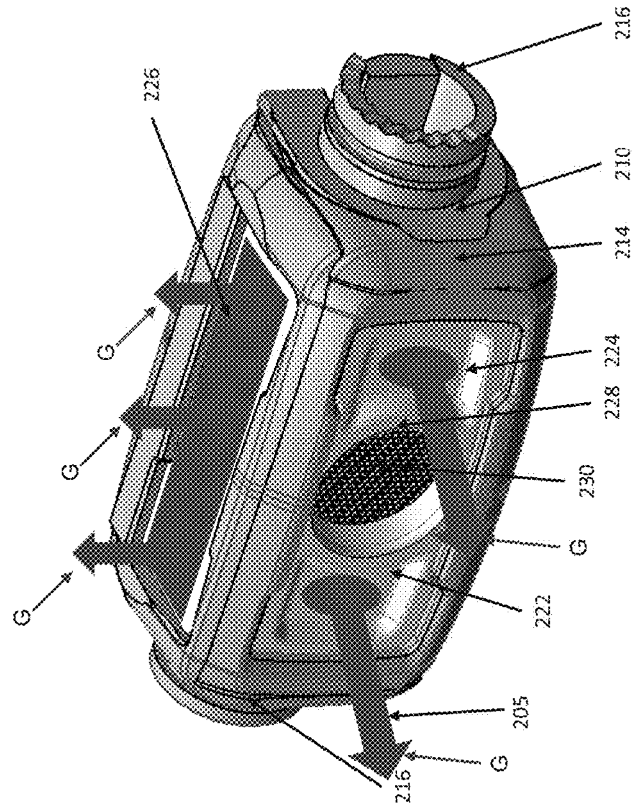
FIGS. 14*a* and 14*b* are perspective views of the light emitting assembly of FIGS. 13*a* and 13*b*.
Figure 14A:
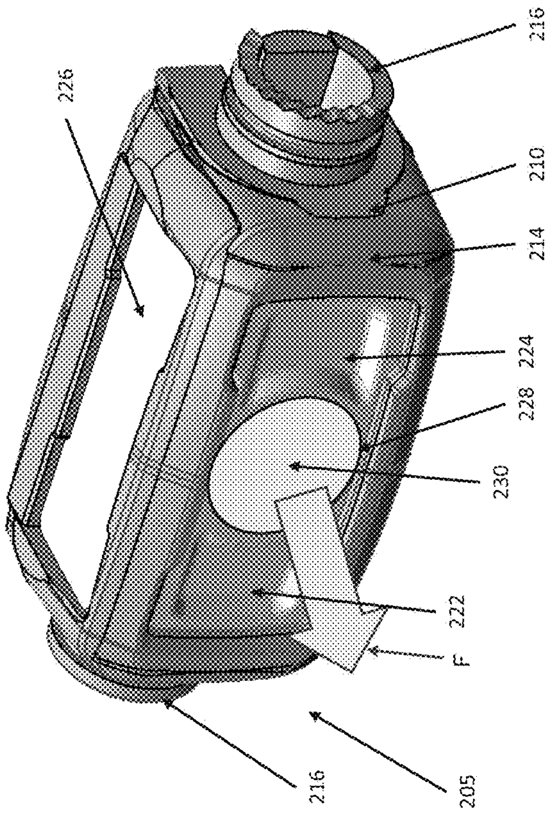
Figure 15A:
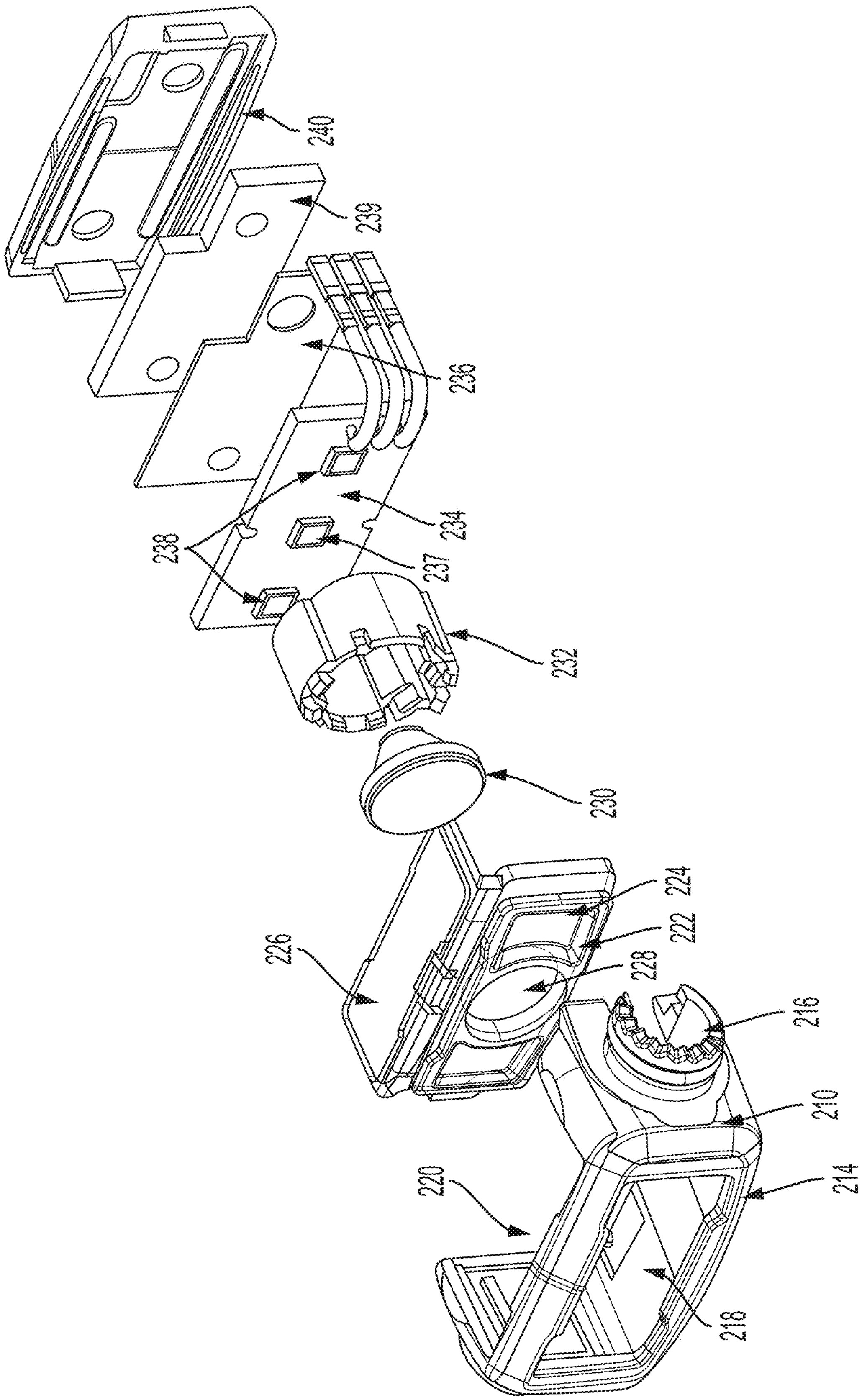
FIGS. 15*a* and 15*b* are exploded views of the light emitting assembly of FIGS. 13*a* and 13*b*.
Figure 15B:
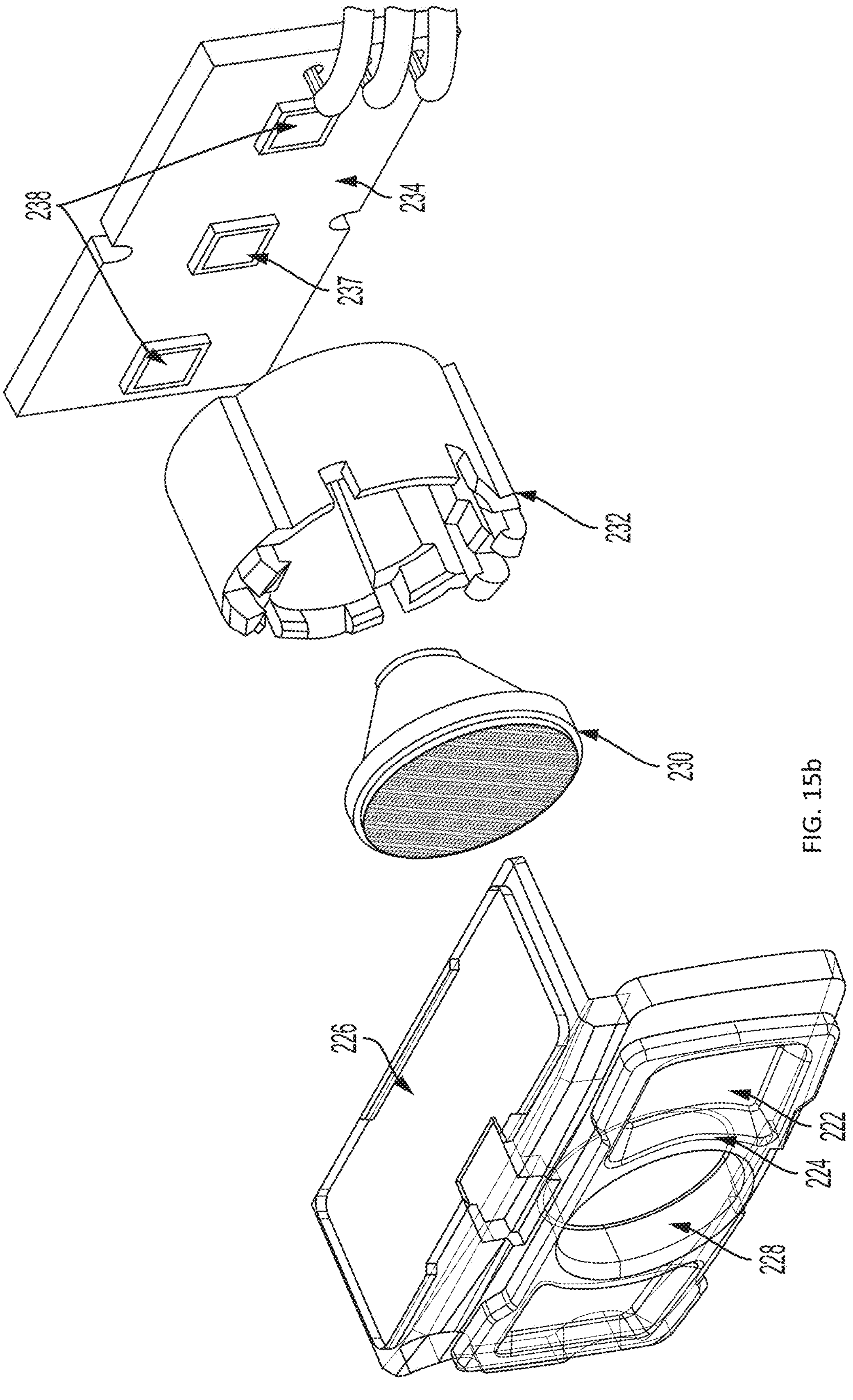

The LED lens 230 is surrounded by an opaque cylindrical lens holder 232. Disposed behind the lens holder 232 is a printed circuit board (PCB) 234 mounted to a thermal pad 236, a heat sink 239, and a rear housing cover 240. Referring also to FIG. 15*a*, mounted on the PCB 234 is an illumination light unit 237 that may include a central white LED aligned with the LED lens 230 and an indicator light unit 238 that may include two colored (e.g., red) LEDs disposed on lateral sides of the illumination light unit 237 outside the outer periphery of the lens holder 232. The LED lens 230 may have a textured or honeycomb pattern on its front surface to help diffuse light from the illumination light unit 237. The light emitting assembly 205 may be operable in an illumination mode (FIG. 14*a*) or an indicator mode (FIG. 14*b*). In the illumination mode, only the white LED of the illumination light unit 237 is illuminated and white light shines through the LED lens 230 in a spotlight fashion to illuminate a workpiece, as indicated by the arrow F. In the indicator mode, the colored LEDs of the indicator light unit 238 are illuminated (with or without turning off the illumination light unit 237) so that colored light shines through the lateral sides of the front portion 224 of the clear cover 222 and the top portion 226 of the clear cover, as indicated by the arrows G. The indicator LEDs can be used to indicate an operation condition of the power tool, such as the gyro kickback condition for shutting off power to the motor during a tool kickback. The colored LEDs may also flash to call the user's attention to their illumination.

Figure 16B:
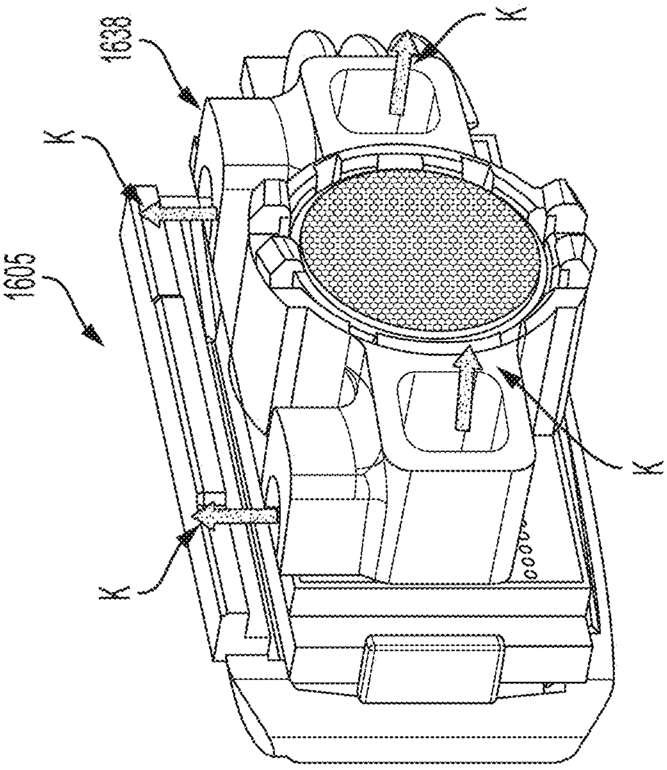
FIG. 16*b* is a perspective cut away view illustrating the isolator of the light emitting assembly of FIG. 16*a*.
Figure 16A:
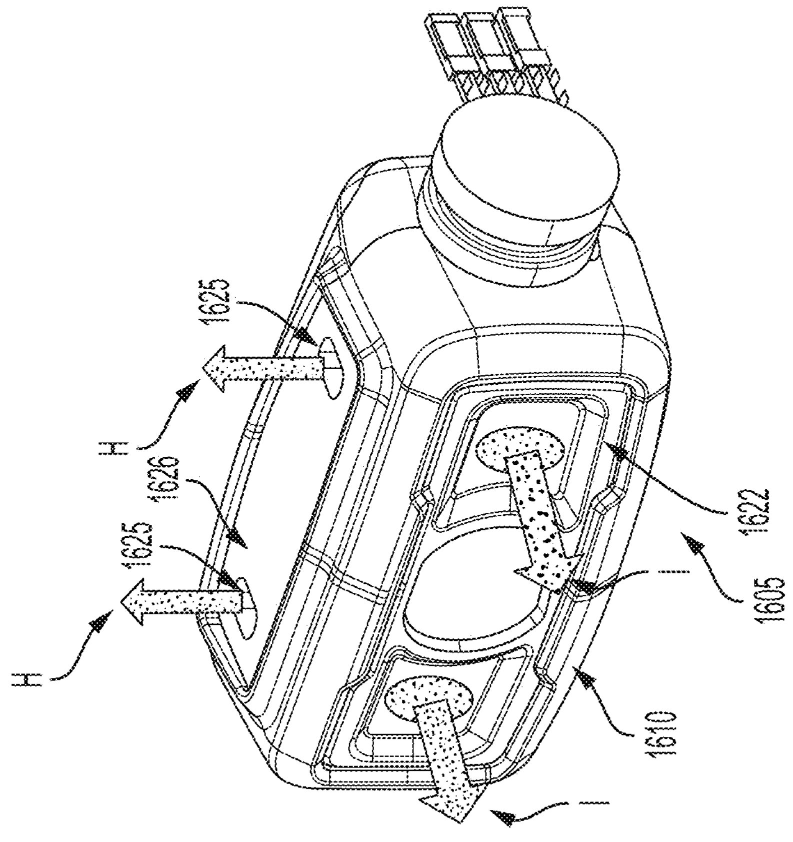
FIG. 16*a* is a perspective view of another example of a light emitting assembly for a power tool.
Figure 16D:
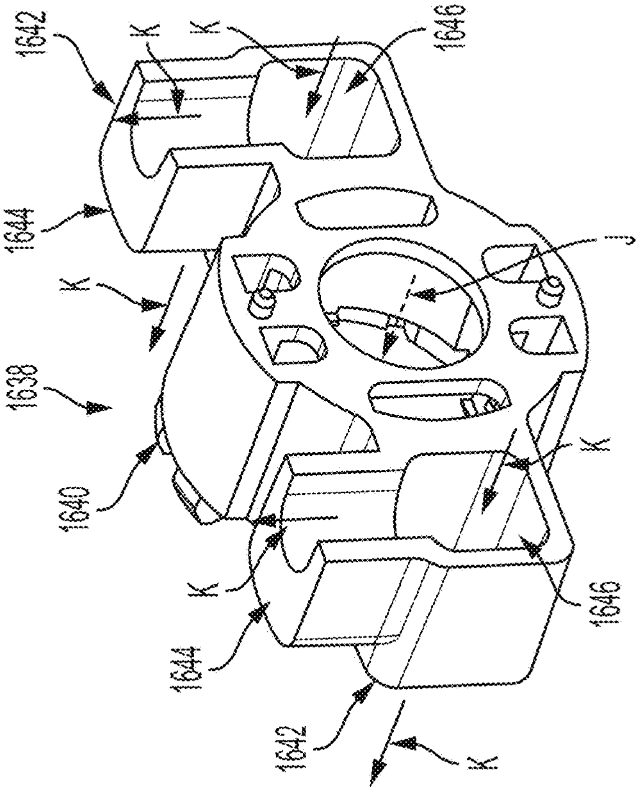
FIGS. 16*c* and 16*d* are front and rear perspective views, respectively, of the isolator of FIG. 16*b*.
Figure 16C:
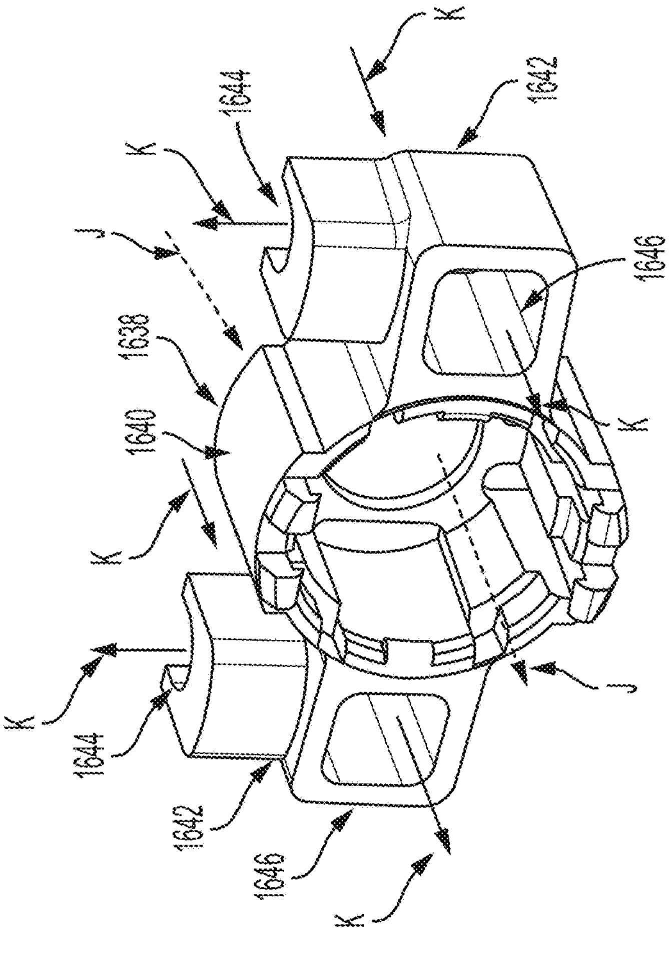

FIGS. 16*a*-16*j* illustrate another example implementation of a light emitting assembly 1605. The light emitting assembly 1605 is similar to the light emitting assembly 205 in FIGS. 13*a*-15*b*, except the light emitting housing 1610 includes a closed top surface 1626 and includes two small windows 1625 through which light from an indicator light unit is emitted, as indicated by the arrows H. Received in the light emitting housing 1610 is a lens or clear cover 1622 through which light from an indicator light unit is emitted, as indicated by the arrows I. FIG. 16*b* illustrates a cut away view of the light emitting assembly 1605 illustrating an isolator 1638. FIGS. 16*c* and 16*d* illustrate a front view and a rear view of the isolator 1638 of FIG. 16*b* with arrows J indicating the direction the light is directed through the isolator from an illumination light unit through the center and with arrows K indicating the direction the light is directed from an indicator light unit through the sides in the front and the top. The isolator 1638 includes a center portion 1640 and two side portions 1642. The center portion 1640 may be generally circular in shape and be configured to direct light emitted from an illumination light, as indicated by the arrows J. The light directed through the center portion 1640 is isolated from the light directed through the side portions 1642. The side portions 1642 may be integrally formed with the center portion 1640 and may include multiple paths for directing light in multiple different directions as emitted by an indicator light, as indicated by the arrows K. The side portions 1642 may include a semi-circular top portion 1644 for directing light in one direction and a square front portion 1646 for directing light in another direction that is generally perpendicular to the light emitted through the semi-circular top portion 1644.

Figure 16E:
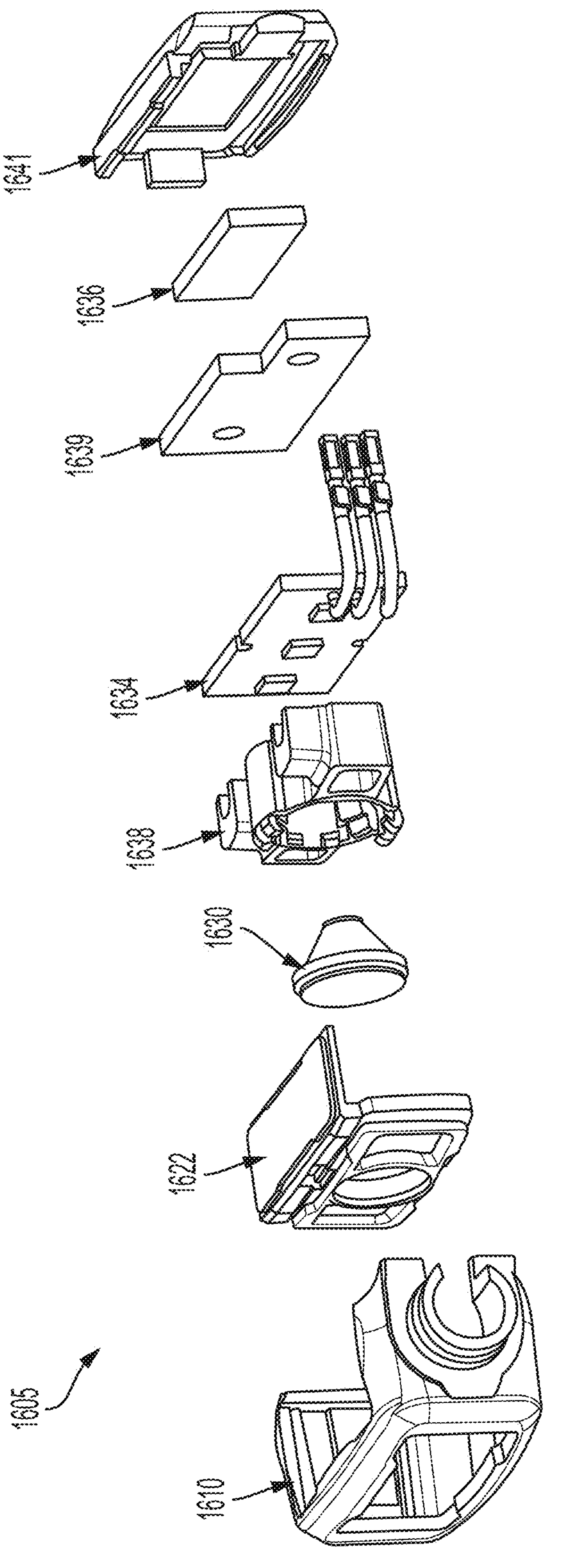
FIG. 16*e* is an exploded view of the light emitting assembly of FIG. 16*a* with one example isolator.

FIG. 16*e* illustrates an exploded view of the light emitting assembly 1605 with one example isolator 1638 from FIGS. 16*b*, 16*c*, and 16*d*. The light emitting assembly 1605 includes the light emitting housing 1610, a transparent or translucent L-shaped lens or clear cover 1622 received in the light emitting housing 1610, a conical or translucent LED lens 1630 received in the clear cover 1622, the isolator 1638, a PCB 1634, a heat sink 1639, a thermal pad 1636, and a rear cover 1641.

Figure 16F:
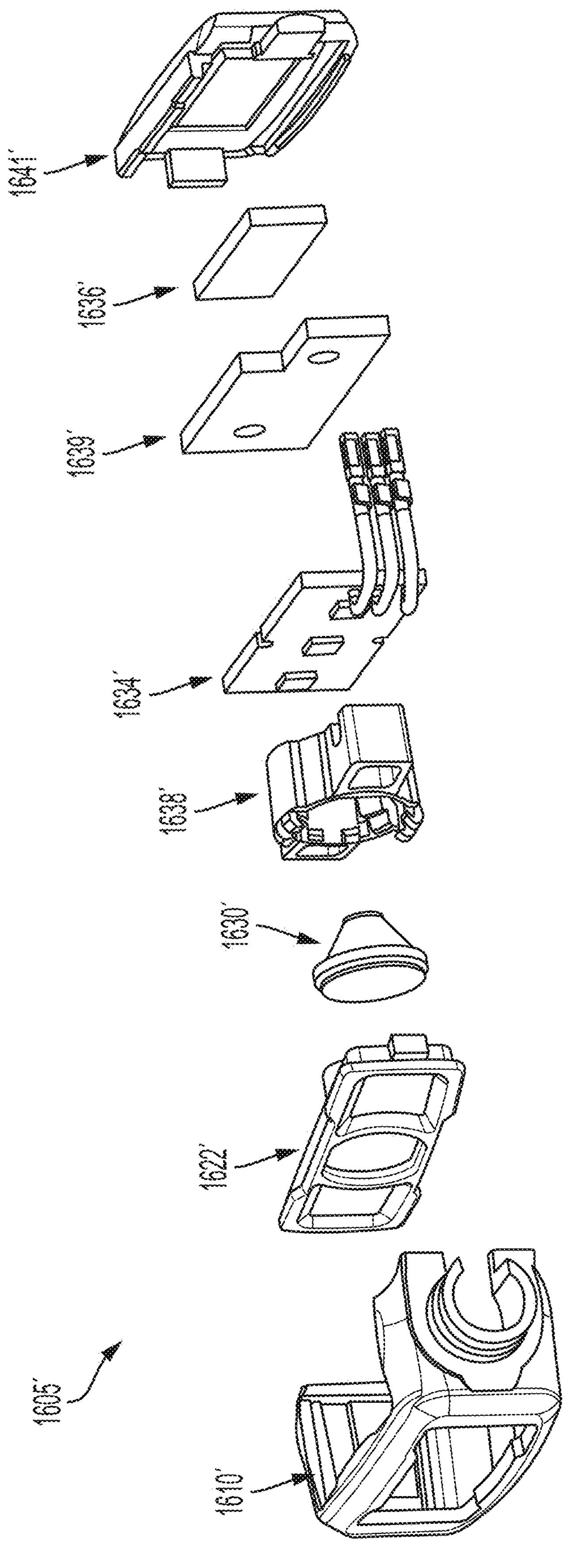
FIG. 16*f* is an exploded view of the light emitting assembly of FIG. 16*a* with another example isolator.

FIG. 16*f* illustrates an exploded view of a light emitting assembly 1605' that is similar to the light emitting assembly 1605, except with another example isolator 1638' and a different clear cover 1622'. The light emitting assembly 1605' includes a light emitting housing 1610', a transparent or translucent lens or clear cover 1622' received in the light emitting housing 1610', a conical or translucent LED lens 1630' received in the clear cover 1622', the isolator 1638', a PCB 1634', a heat sink 1639', a thermal pad 1636', and a rear cover 1641'. The isolator 1638' differ slightly in design from the isolator 1638 in that the two side portions do not include an extra piece on the top of the side portion.

Figure 16H:
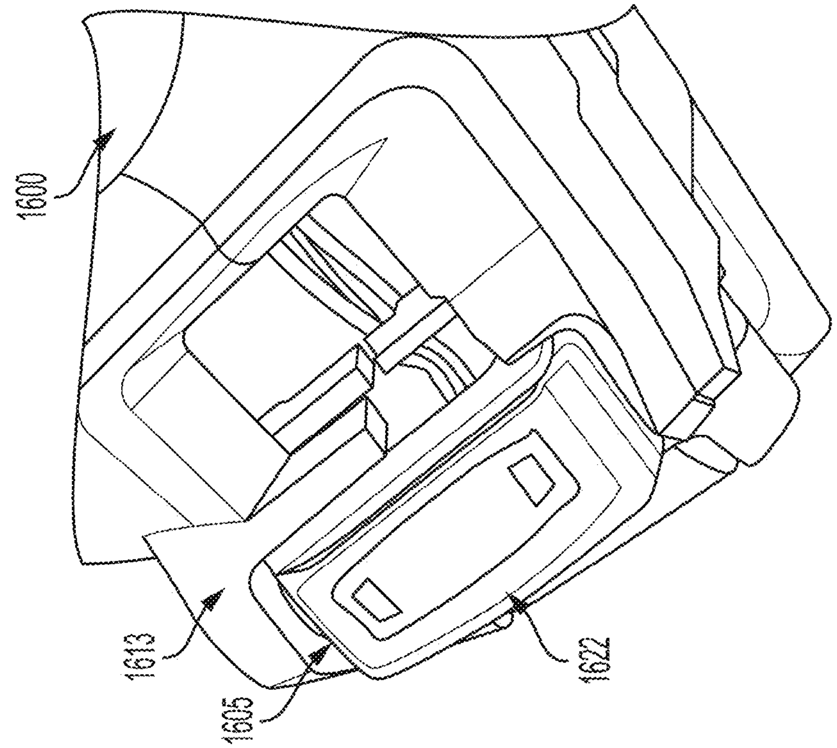
FIGS. 16*g* and 16*h* illustrate the light emitting assembly of FIG. 16*a* coupled to a power tool and being pivoted between two positions.
Figure 16G:
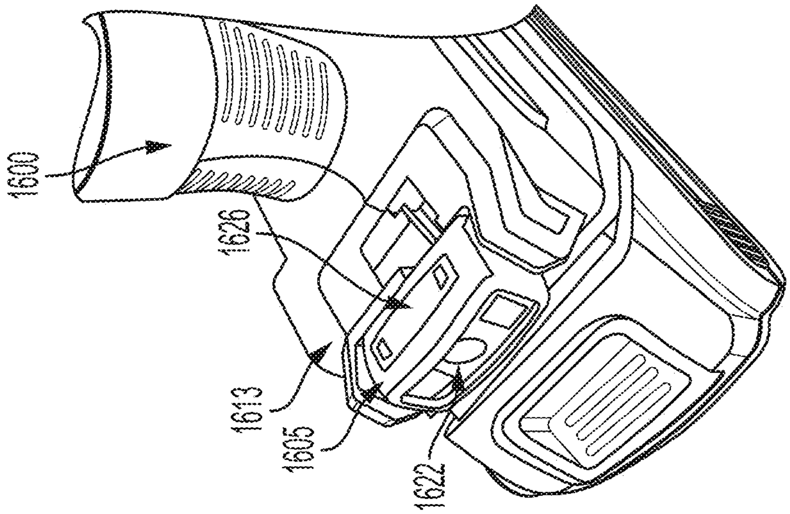

FIGS. 16*g* and 16*h* illustrate the light emitting assembly 1605 of FIG. 16*a* coupled to a power tool 1600 and being pivoted between two positions. In FIG. 16*g*, the light emitting assembly 1605 is pivotably coupled to the base 1613 of the power tool 1600. The light emitting assembly 1605 is pivotably rotated within the base 1613 in a first position such that the light from an indicator light is illuminated and visible through both the top surface 1626 of the light emitting assembly 1605 and the clear cover 1622. In FIG. 16*h*, the light emitting assembly 1605 is pivotably rotated within the base 1613 in a second position such that the light from an indicator light is illuminated and visible through only the clear cover 1622 and not through the top surface 1626.

Figure 16I:
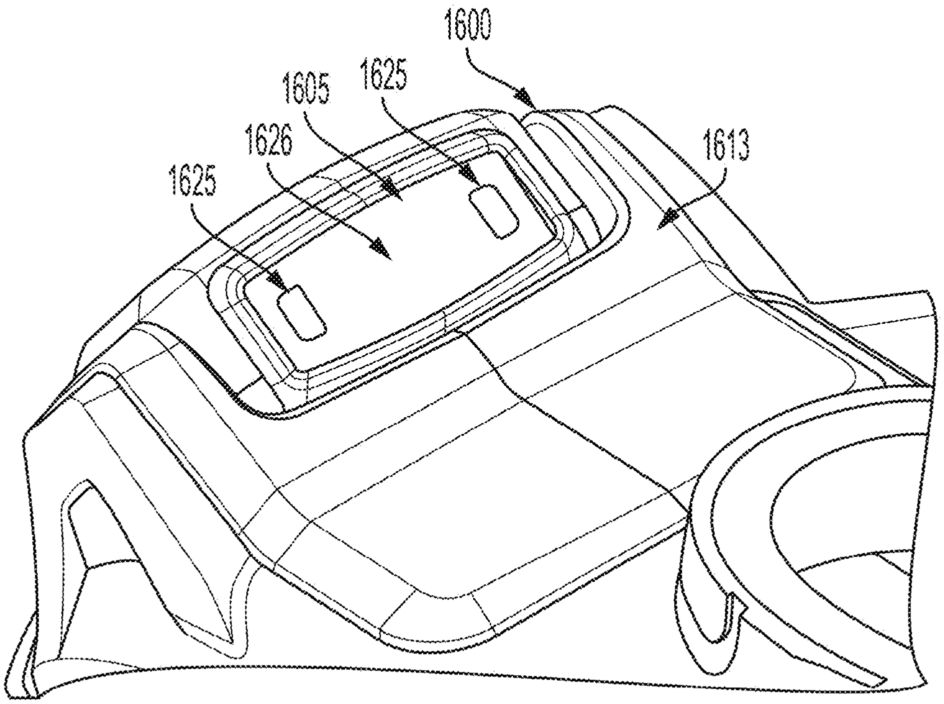
FIGS. 16*i* and 16*j* illustrate example label options for the top surface of the light emitting assembly of FIG. 16*a*.
Figure 16J:
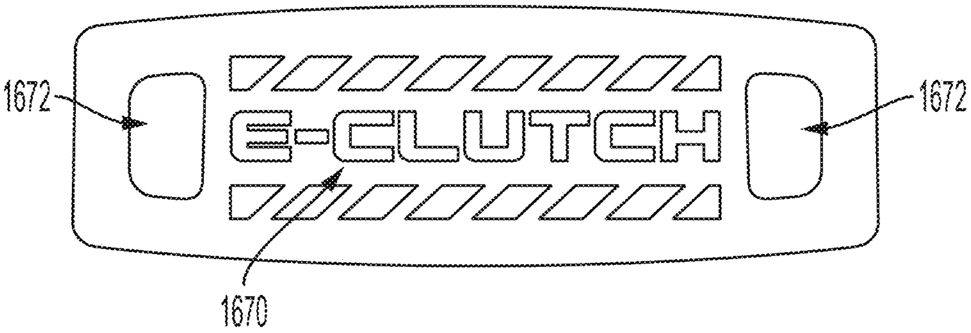

FIGS. 16*i* and 16*j* illustrate example label options for the top surface 1626 of the light emitting assembly 1605 of FIG. 16*a*. FIG. 16*i* illustrates the light emitting assembly 1605 pivotably coupled to the base 1613 of the power tool 1600. In this example, light, including color light, may shine through the small windows 1625 of the top surface 1626, where the small windows 1625 may be transparent or translucent. FIG. 16*j* illustrates a label 1670, which in this example is labelled "E-CLUTCH". The label 1670 may be affixed to the top surface 1626 and be configured to illuminate when the light is emitted through the top surface 1626. In some implementations, the label 1670 is illuminated with light shining through the small windows 1625. In some implementations, the label 1670 is illuminated with light shining through the top surface 1626 and/or the small windows 1625. When the light shines through the top surface 1626, the entire label 1670 may illuminate. In some implementations, the small windows 1625 may be covered with a colored translucent cover 1672. Other labels and/or logos other than "E-CLUTCH" may be used, for instance, to indicate a particular condition of the power tool 1600 to the user.

Figure 17B:
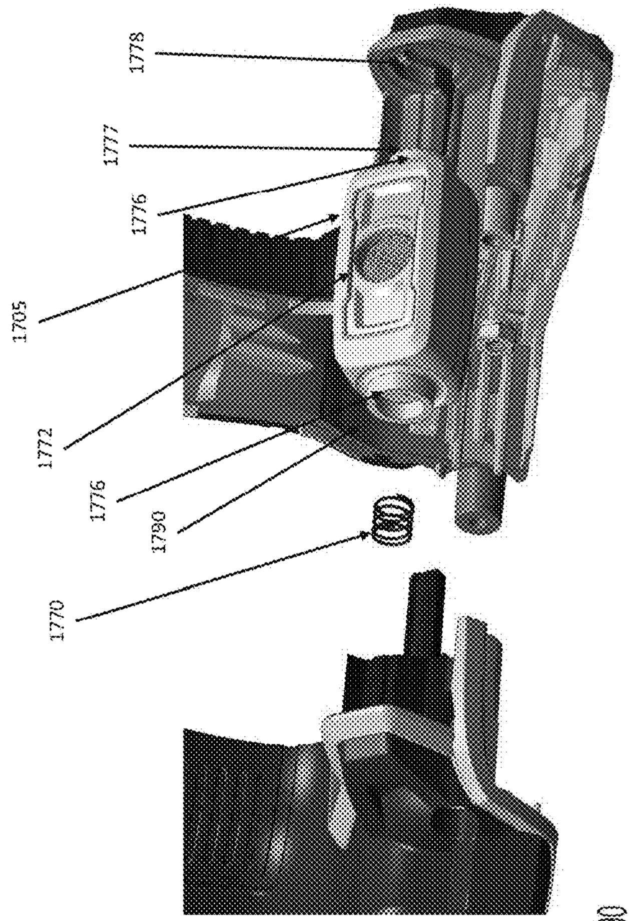
FIGS. 17*a*-17*d* illustrate an example pivoting mechanism for a light emitting assembly in a power tool.
Figure 17A:
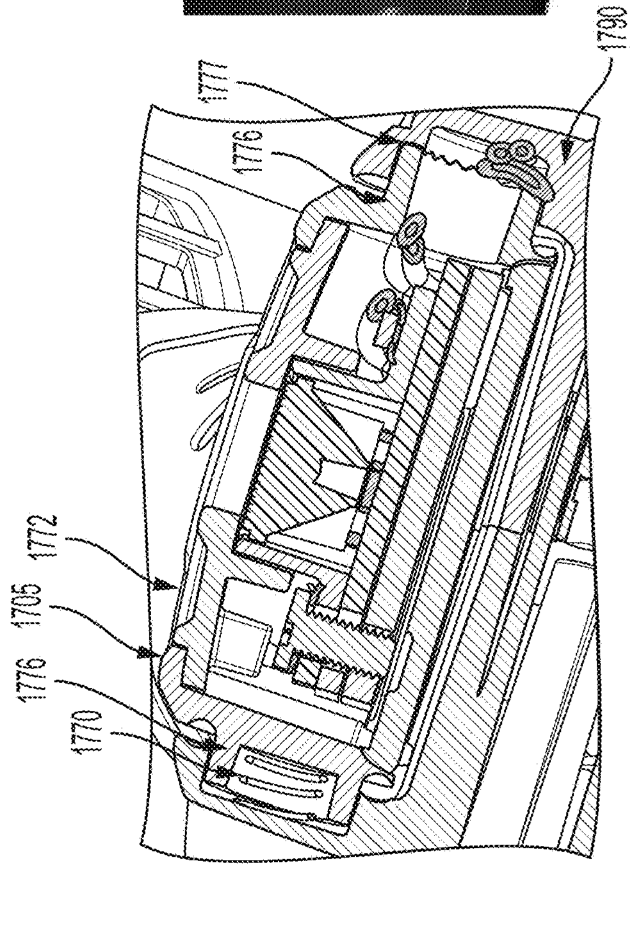
Figure 17D:
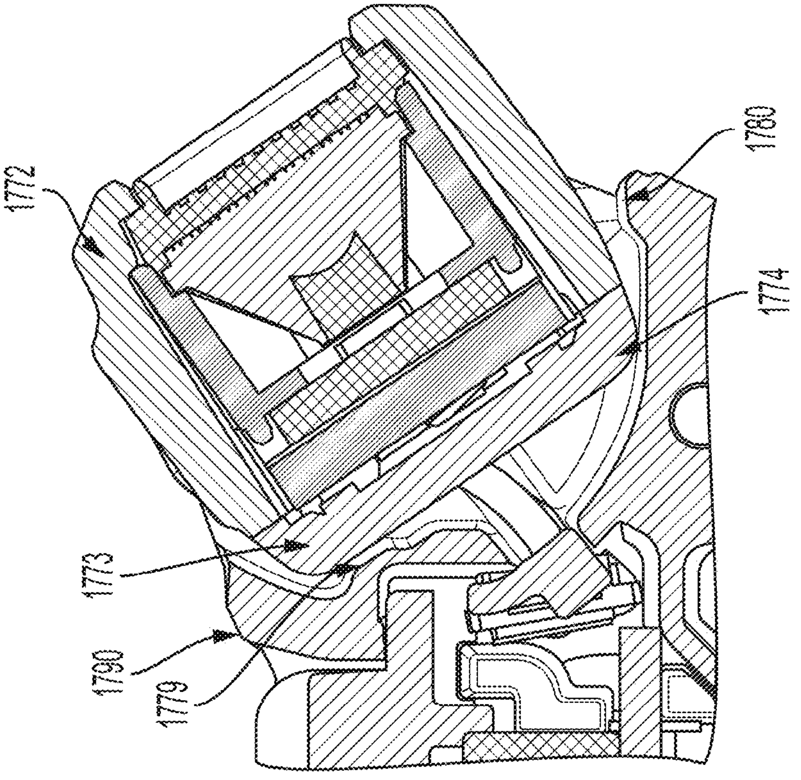
Figure 17C:
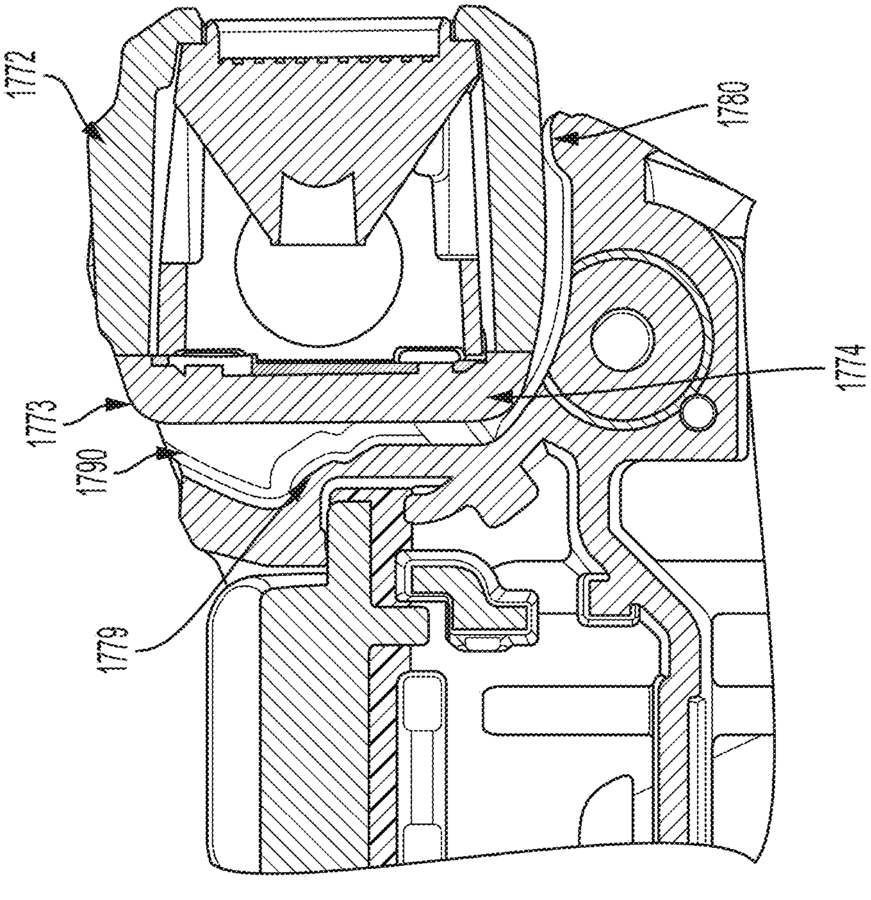

Any of the foregoing light emitting assemblies 5, 605, 1605 may be pivotally coupled to the base at the second end of the handle of the power tool by a pivot mechanism. As shown in FIGS. 17*a*-17*d*, for example, a pivot mechanism 1700 for a light emitting assembly includes a detent mechanism 1770 (e.g., a detent spring) for retaining the light emitting housing 1772 in various angular positions relative to the base and, more specifically, to the battery receptacle when the light emitting housing 1772 pivots, with FIG. 17*a* illustrating an assembled view, FIG. 17*b* illustrating an exploded view, FIG. 17*c* illustrating a cut-away assembled view with the light emitting housing 1772 in a first position, and FIG. 17*d* illustrating a cut-away assembled view with the light emitting housing 1772 in a second position. The light emitting housing 1772 includes projections 1776 on either end with a plurality of teeth 1777 on one end that move with the light emitting housing 1772 as it pivots and that engage a stationary tooth 1778 on the battery pack receptacle of the tool. On the other end, the light emitting housing 1772 is biased laterally toward the stationary tooth 1778 by a detent mechanism 1770 (e.g., a detent spring) on the opposite side of the light emitting housing 1772. The detent mechanism 1770 (e.g., detent spring) pushes the pivoting teeth 1777 on the light emitting housing 1772 toward the stationary tooth 1778 on the battery receptacle as the capsule pivots relative to the battery receptacle.

As illustrated in FIG. 17*d*, the geometry or shape of the light emitting housing 1772 on a first corner 1773 and a second corner 1774 of the light emitting housing 1772 work in combination with a first stop surface 1779 and a second stop surface 1780 in the battery receptacle to limit the angular travel of the light emitting housing 1772 as it pivots within the battery receptacle 1790. In some implementations, the light emitting housing 1772 may travel in an angular range of approximately zero degrees to approximately forty five degrees within the battery receptacle 1790 as limited by the first corner 1773, the second corner 1774, the first stop surface 1779, and the second stop surface 1780.

Figure 18C:
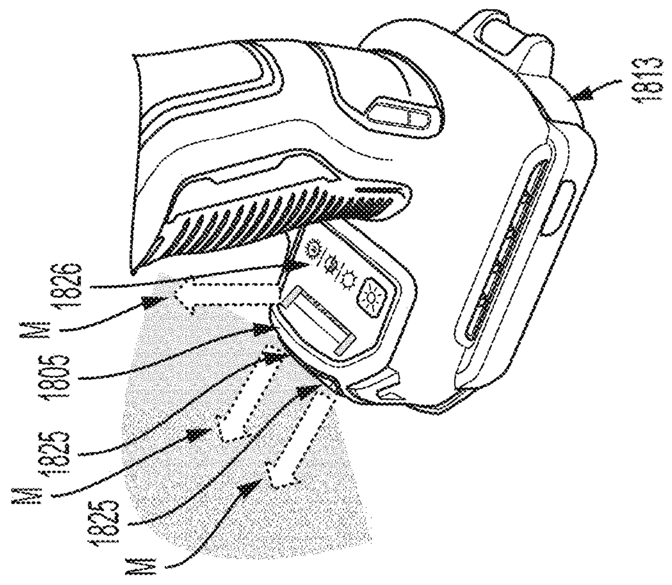
FIGS. 18*b*-18*c* illustrate an example illumination mode and indicator mode for the light emitting assembly of FIG. 18*a*.
Figure 18B:
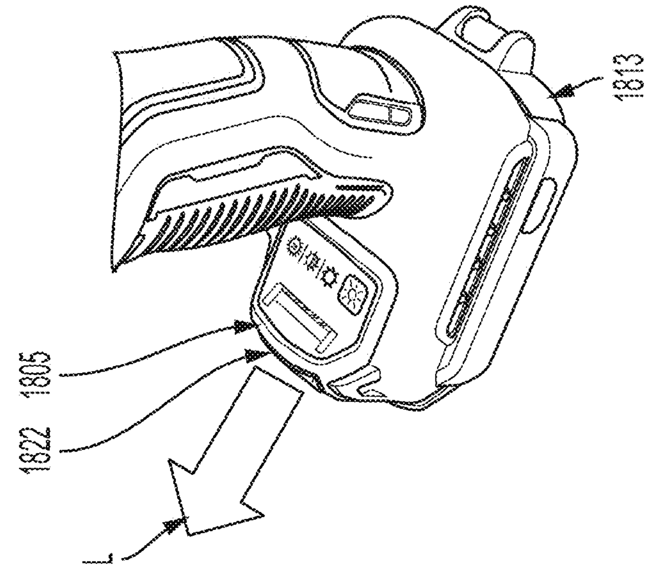
Figure 18A:
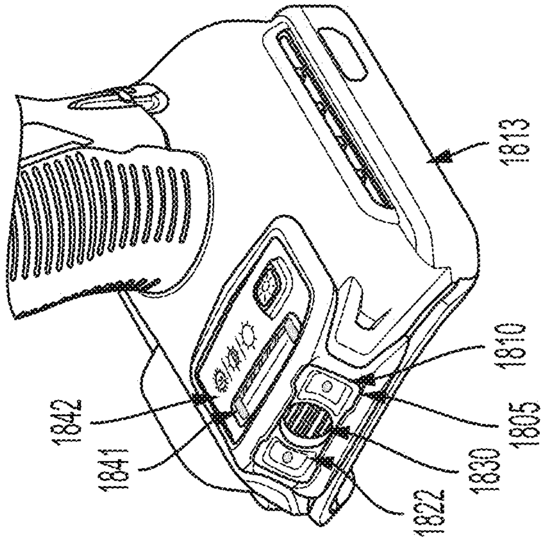
FIG. 18*a* is a perspective view of another example of a power tool with a light emitting assembly.

Referring to FIGS. 18*a*-18*c*, in another implementation of a light emitting assembly 1805, the colored indicator LEDs may illuminate a portion of indicia 1841 on the top of the base 1813, while still shining through the front portion 1824 clear cover 1822. The indicia 1841 may be located on a user interface 1842 with a pushbutton switch and other indicators for selecting a mode of operation of the tool or light. In this example, the light emitting housing 1810 is fixedly coupled to the base 1813 of the handle and is not pivotable within the base 1813. As illustrated in FIG. 18*b*, light may be emitted through the clear cover 1822 from an illumination light to illuminate a workpiece, as indicated by the arrow L. The light emitting assembly 1805 may be fixed at an angle within the base 1813 such that the light indicated by the arrow L is directed toward a workpiece when the tool is in use. As illustrated in FIG. 18*c*, light may be emitted through the top surface 1826 and the small windows 1825 of the clear cover 1822 from an indicator light that indicates a condition of the power tool to the user, as indicated by the arrows M.

Figure 19C:
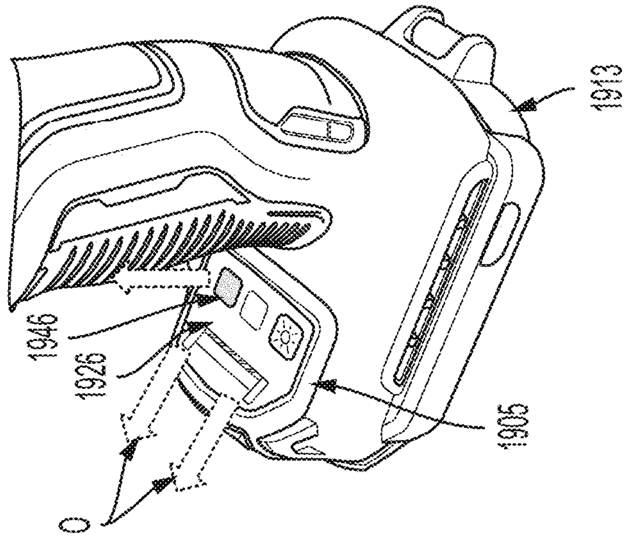
FIGS. 19*b*-19*c* illustrate an example illumination mode and indicator mode for the light emitting assembly according of FIG. 19*a*.
Figure 19B:
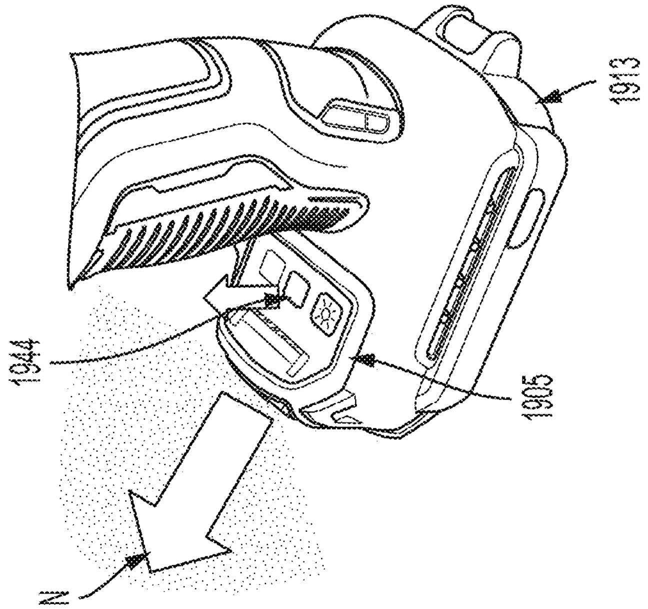
Figure 19A:
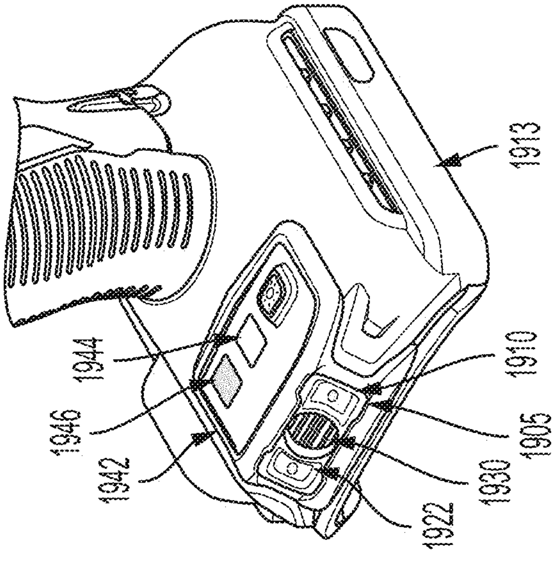
FIG. 19*a* is a perspective view of another example of a power tool with a light emitting assembly.
Figure 21A:
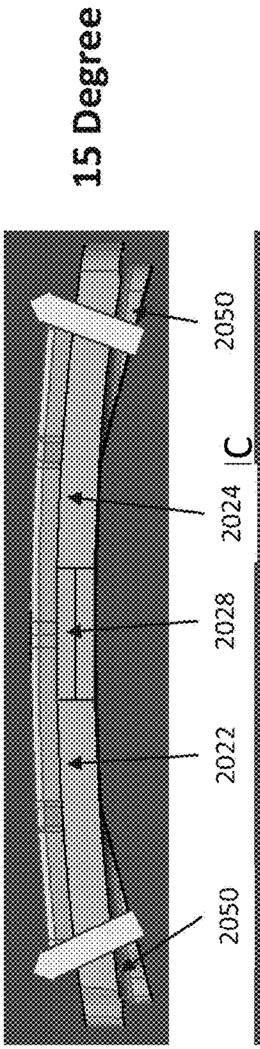
FIGS. 21*a*-21*c* illustrate example areas of illumination for the light emitting assembly of FIG. 20.
Figure 21B:
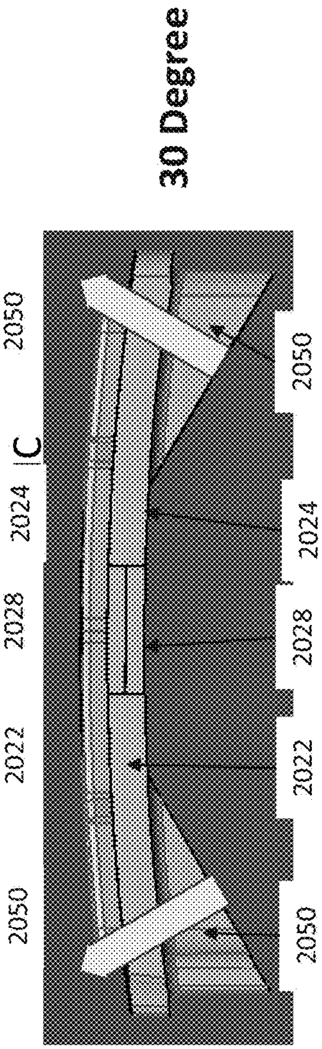
Figure 21C:
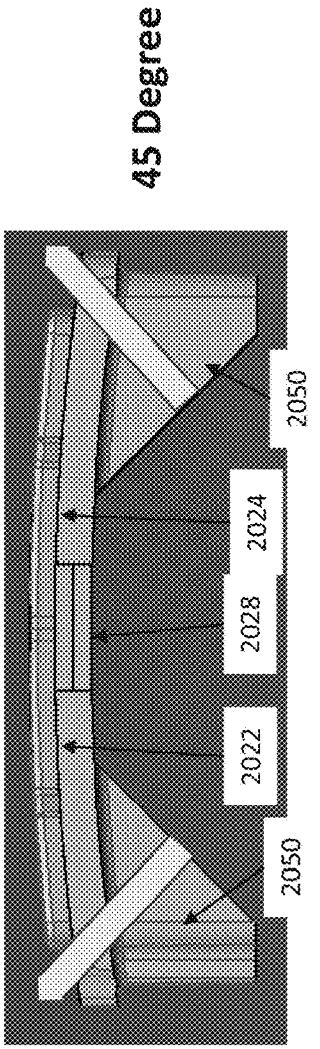
Figure 20:
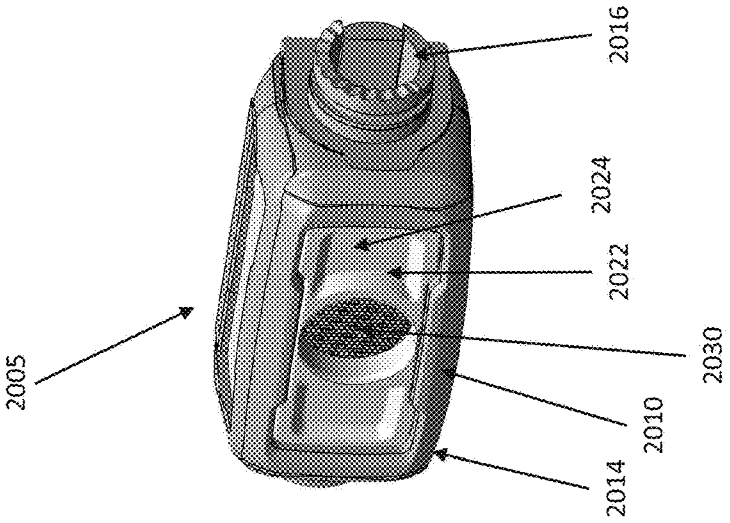
FIG. 20 illustrates an example light emitting assembly for a power tool according to another example implementation.

Referring to FIGS. 19*a*-19*c*, in another implementation of a light emitting assembly 1905, the user interface 1942 may instead or in addition have a white indicator LED 1944 for indicating when the tool is being operated in the illumination mode and a red indicator LED 1946 for indicating when the tool is being operated in the indicator mode. The LEDs 1944, 1946 may be mounted on the same PCB as the central white LED or may be mounted on a different PCB. In this example, the light emitting housing 1910 is fixedly coupled to the base 1913 of the handle and is not pivotable within the base 1913. As illustrated in FIG. 19*b*, light may be emitted through the clear cover 1922 through the lens 1930 in the illumination mode, as indicated by the arrow N, and the LED 1944 may be lit to indicate the illumination mode. As illustrated in FIG. 19*c*, light may be emitted through the top surface 1926 when the tool is in an indication mode, as indicated by the arrows O, and the LED 1946 may be illuminated.

Referring to FIGS. 20 and 21*a*-21*c*, another implementation of a light emitting assembly 2005 is illustrated. The light emitting assembly 2005 includes a light emitting housing 2010. The light emitting housing 2010 includes an enclosure 2014 with pivot projections 2016 on either side. Received in the enclosure 2014 is a transparent or translucent L-shaped lens or clear cover 2022 with a front portion 2024. The front portion 2024 of the clear cover 2022 has a central opening 2028 that receives a conical transparent or translucent LED lens 2030. The front portion 2024 of clear cover 2022 may have lateral side portions 2050 with a prism shape for refracting the light from the white LED and/or the colored LEDs for a wider area of illumination ranging from approximately 15 degree in FIG. 21*a* to approximately 30 degree in FIG. 21*b* to approximately 45 degree in FIG. 21*c*.

In the following, some examples are described.

Example 1: A power tool, comprising:

a housing containing a motor;

an output member configured to be driven by the motor to perform an operation on a workpiece;

a handle having a first end portion coupled to the housing and a second end portion;

a base coupled to the second end portion of the handle; and a light emitting assembly pivotably coupled to the base, the light emitting assembly configured to be operable in a first mode to illuminate the workpiece and a second mode to indicate a condition of the power tool responsive to the power tool signaling the condition to the light emitting assembly.

Example 2: The power tool of example 1, wherein the light emitting assembly includes a first light unit that illuminates in the first mode and a second light unit that illuminates in the second mode.

Example 3: The power tool of example 2, wherein the first light unit comprises a first LED.

Example 4: The power tool of example 2 or 3, wherein the second light unit comprises a plurality of second LEDs.

Example 5: The power tool of any of examples 2 through 4, wherein the light emitting assembly includes an isolator that isolates an illumination of the first light unit from an illumination of the second light unit.

Example 6: The power tool of any of the preceding examples, wherein the light emitting assembly includes a front surface that faces generally toward the workpiece and a top surface transverse to the front surface that faces generally toward the housing.

Example 7: The power tool of example 6, wherein, in the second mode, the second light unit illuminates through both the front surface and the top surface of the light emitting assembly.

Example 8: The power tool of example 6 or 7, wherein the top surface comprises indicia with a transparent or translucent portion through which the second light unit illuminates in the second mode.

Example 9: The power tool of any of examples 6 through 8, wherein, in the first mode, the first light unit illuminates only through the front surface of the light emitting assembly.

Example 10: The power tool of any of examples 6 through 9, wherein the light emitting assembly includes an isolator configured to isolate light from the first light unit from light from the second light unit.

Example 11: The power tool of example 10, wherein the isolator is configured to direct light from the first light unit toward the front surface and to direct light from the second light unit toward the front surface and the top surface.

Example 12: The power tool of any of examples 2 through 11, wherein the first light unit has a first light quality and the second light unit has a second light quality that is different from the first light quality.

Example 13: The power tool of example 12, wherein the first light quality comprises a first color and the second light quality comprises a second color that is different from the first color.

Example 14: The power tool of example 12 or 13, wherein the first light quality comprises a first brightness and the second light quality comprises a second brightness that is different from the first brightness.

Example 15: The power tool of any of examples 12 through 14, wherein the first light quality comprises a steady light and the second light quality comprises a flashing light.

Example 16: A power tool comprising:

a housing containing a motor;

an output member configured to be driven by the motor to perform an operation on a workpiece;

a handle having a first end portion coupled to the housing and a second end portion;

a base coupled to the second end portion of the handle; and a light emitting assembly coupled to the base and including a front surface that faces generally toward the workpiece and a top surface transverse to the front surface that faces generally toward the housing, wherein the light emitting assembly is configured to be operable in a first mode in which light having a first light quality is emitted only from a front surface of the light emitting assembly toward the workpiece to illuminate the workpiece and in a second mode in which light having a second light quality is emitted from both the front surface and the top surface of the light emitting assembly.

Example 17: The power tool of example 16, wherein the first light quality comprises a first color and the second light quality comprises a second color that is different from the first color.

Example 18: The power tool of example 16 or 17, wherein the first light quality comprises a first brightness and the second light quality comprises a second brightness that is different from the first brightness.

Example 19: The power tool of any of examples 16 through 18, wherein the first light quality comprises a steady light and the second light quality comprises a flashing light.

Example 20: The power tool of any of examples 16 through 19, wherein the light emitting assembly includes a first light unit that illuminates in the first mode, a second light unit that illuminates in the second mode, and an isolator configured to isolate light from the first light unit from light from the second light unit.

Example 21: The power tool of any of examples 16 through 20, wherein the second mode indicates a condition of the power tool responsive to the power tool signaling the condition to the light emitting assembly.

Example 22: A power tool comprising:

a housing containing a motor;

an output member configured to be driven by the motor to perform an operation on a workpiece;

a handle having a first end portion coupled to the housing and a second end portion;

a base coupled to the second end portion of the handle; and a light emitting assembly coupled to the base and including a front surface that faces generally toward the workpiece, a top surface transverse to the front surface that faces generally toward the housing, a first light unit received in the light emitting assembly, a second light unit received in the light emitting assembly, and an isolator received in the light emitting assembly, wherein the isolator is configured to direct light from the first light unit toward the front surface, to direct light from the second light unit toward the front surface and the top surface, and to isolate the light from the first light unit from the light from the second light unit.

Example 23: The power tool of example 22, wherein the first light unit has a first light quality and the second light unit has a second light quality that is different from the first light quality.

Example 24: The power tool of example 23, wherein the first light quality comprises a first color and the second light quality comprises a second color that is different from the first color.

Example 25: The power tool of example 23 or 24, wherein the first light quality comprises a first brightness and the second light quality comprises a second brightness that is different from the first brightness.

Example 26: The power tool of any of examples 23 through 25, wherein the first light quality comprises a steady light and the second light quality comprises a flashing light.

Example 27: The power tool of any of examples 22 through 26, wherein the light emitting assembly is configured to be operable in a first mode to illuminate the workpiece and a second mode to indicate a condition of the power tool responsive to the power tool signaling the condition to the light emitting assembly.

As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as “generally,” “substantially,” “approximately,” and “about” may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A power tool comprising:

a housing containing a motor;

an output member configured to be driven by the motor to perform an operation on a workpiece;

a handle having a first end portion coupled to the housing and a second end portion;

a base coupled to the second end portion of the handle, the base including a battery receptacle configured to receive a battery;

a light emitting assembly pivotably coupled to the base, the light emitting assembly including a first light unit in which light is emitted in a first direction towards the workpiece and a second light unit in which light is emitted in at least a second direction, the second direction being different than the first direction;

a user interface electronically coupled to the light emitting assembly, the user interface configured to receive a selection of a mode of operation of the light emitting assembly; and a controller electronically coupled to the user interface and the light emitting assembly, the controller configured to;

receive the selection and to control the mode of operation in response to the selection, receive a signal indicating a condition of the power tool, control the first light unit to be operable in a first mode in which light from the first light unit has a first light quality to illuminate the workpiece, and control the second light unit to be operable in a second mode in which light from the second light unit has a second light quality to indicate the condition of the power tool.

2. The power tool of claim 1, wherein:

the light emitting assembly includes an isolator received in the light emitting assembly, wherein the isolator is configured to direct light from the first light unit toward at least one surface of the light emitting assembly to illuminate the workpiece, to direct light from the second light unit toward the at least one surface, and to isolate the light from the first light unit from the light from the second light unit.

3. The power tool of claim 2, wherein the at least one surface includes a first surface that faces generally toward the workpiece and a second surface that faces generally toward the housing.

4. The power tool of claim 3, wherein, in the first mode, the light from the first light unit is emitted from at least the first surface and, in the second mode, the light from the second light unit is emitted from at least the second surface.

5. The power tool of claim 4, wherein, in the first mode, the light from the first light unit is emitted only from the first surface and, in the second mode, the light from the second light unit is emitted only from the second surface.

6. The power tool of claim 2, wherein the light emitting assembly is configured to be operable in the first mode and in the second mode simultaneously.

7. The power tool of claim 2, wherein the condition of the power tool comprises a kickback of the housing.

8. The power tool of claim 1, wherein:

the light emitting assembly includes an isolator, wherein the isolator includes:

a first light path to direct only light from the first light unit through a first opening, and a second light path isolated from the first light path to direct only light from the second light unit through a second opening.

9. The power tool of claim 8, wherein the light emitting assembly further comprises a third light unit and the isolator further comprises a third light path isolated from the first light path to direct only light from the second light unit through a third opening.

10. The power tool of claim 9, wherein:

the first light path is disposed in a center of the isolator, and the second light path and the third light path are disposed on either side of the first light path.

11. The power tool of claim 9, wherein the isolator includes a first wall separating the first light path from the second light path and a second wall separating the first light path from the third light path.

12. The power tool of claim 9, wherein:

the first opening directs the light from the first light path in the first direction, and the second opening and the third opening direct the light from the second light path and the third light path in the second direction, the second direction being different than the first direction.

13. The power tool of claim 8, wherein:

the first light unit includes a light having a first color, and the second light unit includes a light having a second color, the second color being different than the first color.

14. The power tool of claim 1, wherein the user interface includes a switch to receive the selection of the mode of operation and at least one indicator to indicate the mode of operation.

15. The power tool of claim 14, wherein the at least one indicator includes multiple lights to indicate the mode of operation.

16. The power tool of claim 14, wherein the switch includes a selector button, wherein sequential actuations of the selector button cycle through a plurality of modes of operation.

17. The power tool of claim 1, wherein the user interface is disposed on a top surface of the battery receptacle.

18. The power tool of claim 1, wherein the mode of operation includes multiple illumination modes, the multiple illumination modes each having a different brightness.

* * * * *